(12) United States Patent
Kim et al.

(10) Patent No.: US 9,885,446 B2
(45) Date of Patent: Feb. 6, 2018

(54) SYSTEM AND METHOD FOR PROCESSING LIQUEFIED GAS

(71) Applicant: HYUNDAI HEAVY INDUSTRIES CO., LTD., Dong-gu (KR)

(72) Inventors: Ki Hong Kim, Jin-gu (KR); Min Ho Kang, Haeundae-gu (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 566 days.

(21) Appl. No.: 14/348,040

(22) PCT Filed: May 14, 2013

(86) PCT No.: PCT/KR2013/004284
§ 371 (c)(1),
(2) Date: Mar. 27, 2014

(87) PCT Pub. No.: WO2013/172644
PCT Pub. Date: Nov. 21, 2013

(65) Prior Publication Data
US 2014/0238050 A1    Aug. 28, 2014

(30) Foreign Application Priority Data

May 14, 2012    (KR) .......................... 10-2012-0051047
Dec. 14, 2012    (KR) .......................... 10-2012-0146662
(Continued)

(51) Int. Cl.
*F17C 9/00*        (2006.01)
*F17C 7/02*        (2006.01)
(Continued)

(52) U.S. Cl.
CPC ................ *F17C 7/02* (2013.01); *F02M 21/06* (2013.01); *F17C 7/04* (2013.01); *F17C 9/00* (2013.01);
(Continued)

(58) Field of Classification Search
CPC ...... F17C 7/02; F17C 7/04; F17C 9/00; F17C 13/025; F17C 13/026; F17C 2225/035;
(Continued)

(56) References Cited

U.S. PATENT DOCUMENTS 3,864,918 A * 2/1975 Lorenz .................... B63B 25/12
60/651
2004/0255615 A1* 12/2004 Hupkes .................. F25J 1/0022
62/606
(Continued)

FOREIGN PATENT DOCUMENTS

CN    102084114    6/2011
CN    102105736    6/2011
(Continued)

OTHER PUBLICATIONS

Office Action dated Mar. 2, 2016 for Chinese Patent Application No. 201380017484.4 and its English translation by Google translate.
(Continued)

*Primary Examiner* — Dominick L Plakkoottam
*Assistant Examiner* — Webeshet Mengesha
(74) *Attorney, Agent, or Firm* — Ladas & Parry, LLP

(57) ABSTRACT

The present invention relates to a liquefied gas treatment system and method. A liquefied gas treatment system includes: a liquefied gas supply line connected from a liquefied gas storing tank to a source of demand, a heat exchanger provided on the liquefied gas supply line between the source of demand and the liquefied gas storing tank, and configured to heat exchange the liquefied gas supplied from
(Continued)

the pump with heat transfer media with heat transfer media, a media heater configured to heat the heat transfer media, a media circulation line connected from the media heater to the heat exchanger, a media state detecting sensor provided on the media circulation line, and configured to measure a state of the heat transfer media, and a controller configured to set a gasification prevention reference value for preventing the heat transfer media from being gasified, and change a flow rate of the heat transfer media flowing into the media heater or calories supplied to the heat transfer media by the media heater on the basis of a state value of the heat transfer media by the media state detecting sensor and the gasification prevention reference value.

14 Claims, 6 Drawing Sheets

(30) Foreign Application Priority Data

May 14, 2013 (KR) .................. 10-2013-0054617
May 14, 2013 (KR) .................. 10-2013-0054623

(51) Int. Cl.
| | |
|---|---|
| *F17C 13/02* | (2006.01) |
| *F02M 21/06* | (2006.01) |
| *F17C 9/02* | (2006.01) |
| *F17C 7/04* | (2006.01) |
| *F28F 23/02* | (2006.01) |
| *F28F 27/00* | (2006.01) |
| *F28F 19/00* | (2006.01) |
| *C10L 3/12* | (2006.01) |
| *F02M 21/02* | (2006.01) |

(52) U.S. Cl.
CPC .............. *F17C 9/02* (2013.01); *F17C 13/025* (2013.01); *F17C 13/026* (2013.01); *F28F 19/006* (2013.01); *F28F 23/02* (2013.01); *F28F 27/00* (2013.01); *C10L 3/12* (2013.01); *F02M 21/0215* (2013.01); *F02M 21/0245* (2013.01); *F02M 21/0284* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2225/035* (2013.01); *F17C 2227/0135* (2013.01); *F17C 2227/0302* (2013.01); *F17C 2227/0323* (2013.01); *F17C 2250/043* (2013.01); *F17C 2250/0439* (2013.01); *F17C 2250/0456* (2013.01); *F17C 2250/0631* (2013.01); *F17C 2250/0636* (2013.01); *F17C 2250/0652* (2013.01); *F17C 2250/0694* (2013.01); *F17C 2270/0139* (2013.01); *Y02T 10/32* (2013.01)

(58) Field of Classification Search
CPC .......... F17C 2227/0135; F17C 2227/03; F17C 2227/0302; F17C 2227/0304; F17C 2227/0309; F17C 2227/0323; F17C 2250/043; F17C 2250/0439; F17C 2250/0631; F17C 2250/0636; F17C 2250/0694; F17C 2270/0139; F28F 27/00; F28F 2250/06; F28F 2250/08; F28F 13/06; F28F 13/08
See application file for complete search history.

(56) References Cited

U.S. PATENT DOCUMENTS

| | | | | |
|---|---|---|---|---|
| 2009/0308059 | A1* | 12/2009 | Ikemoto | F01N 3/043 60/287 |
| 2011/0132003 | A1* | 6/2011 | Pozivil | F17C 7/04 62/45.1 |
| 2011/0146341 | A1 | 6/2011 | Melaaen | |
| 2011/0167824 | A1* | 7/2011 | Mak | F17C 5/06 60/651 |

FOREIGN PATENT DOCUMENTS

| | | | |
|---|---|---|---|
| JP | H07-139370 | 5/1995 | |
| JP | 2001-263894 | 9/2001 | |
| JP | 2002-081598 | 3/2002 | |
| JP | 2002-276367 | 9/2002 | |
| JP | 2004-324761 | 11/2004 | |
| JP | 2004324761 | * 11/2004 | |
| JP | 2009-530549 | 8/2009 | |
| JP | 4422977 | 3/2010 | |
| JP | 2010-106861 | 5/2010 | |
| JP | 2011-520081 | 7/2011 | |
| JP | 2011-528094 | 11/2011 | |
| JP | 2014-172661 | 9/2014 | |
| KR | 10-0883742 B1 | 2/2009 | |
| KR | 10-2009-0059763 | 6/2009 | |
| KR | 10-2012-0004229 | 1/2012 | |
| KR | 10-2012-0007641 A | 1/2012 | |
| KR | 10-2012-0023406 | 3/2012 | |
| WO | 2008/011666 | 1/2008 | |
| WO | WO2008011666 | * 1/2008 | F28D 17/00 |

OTHER PUBLICATIONS

Office Action dated Apr. 21, 2015 for Japanese Patent Application No. 2014-534498 and its English translation by Google Translate.
Extended European Search Report dated Feb. 19, 2016 for European Patent Application No. 13790990.9.
International Preliminary Report on Patentability (Chapter I) for PCT/KR2013/004284 dated Nov. 18, 2014 and its English machine translation by Google Translate.
Written Opinion of the International Searching Authority for PCT/KR2013/004284 dated Jul. 18, 2013 and its English translation provided by WIPO.
International Search Report for PCT/KR2013/004284 dated Jul. 18, 2013 and a translation thereof.

* cited by examiner

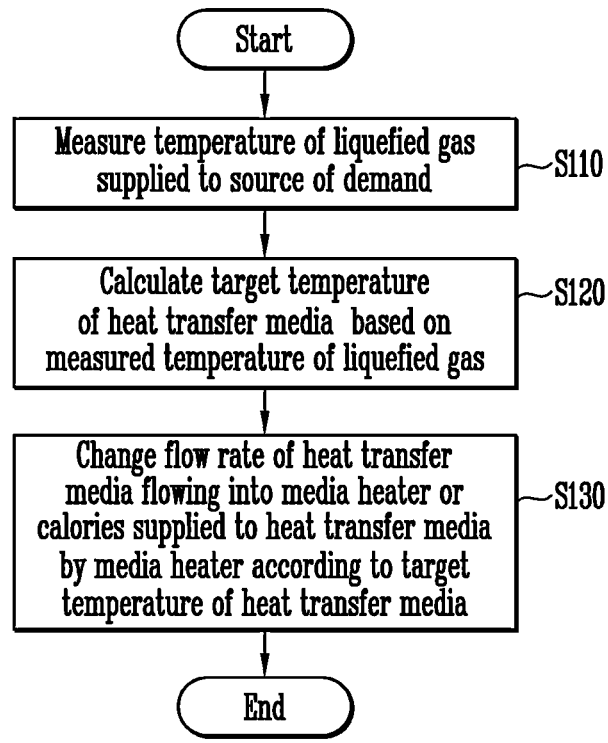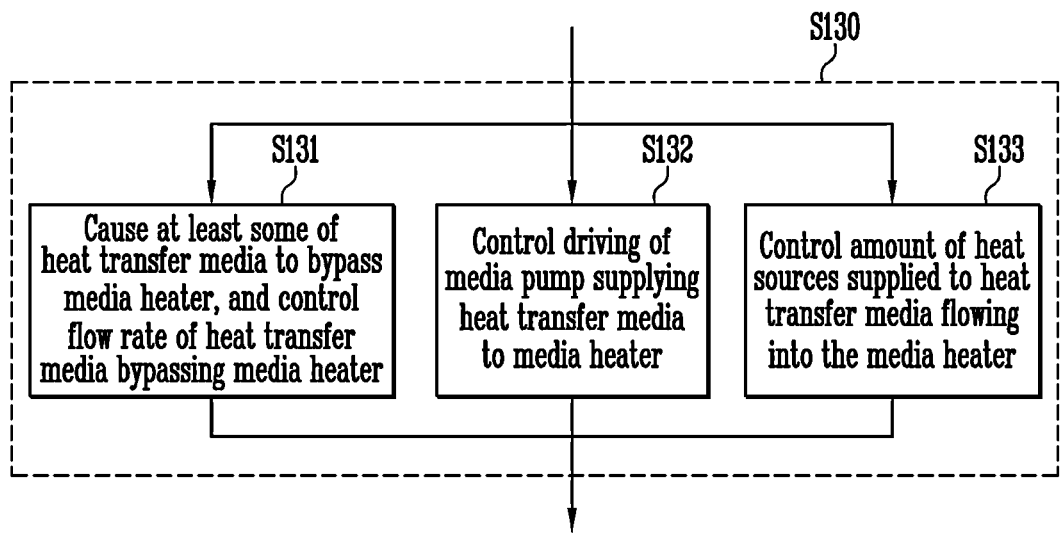

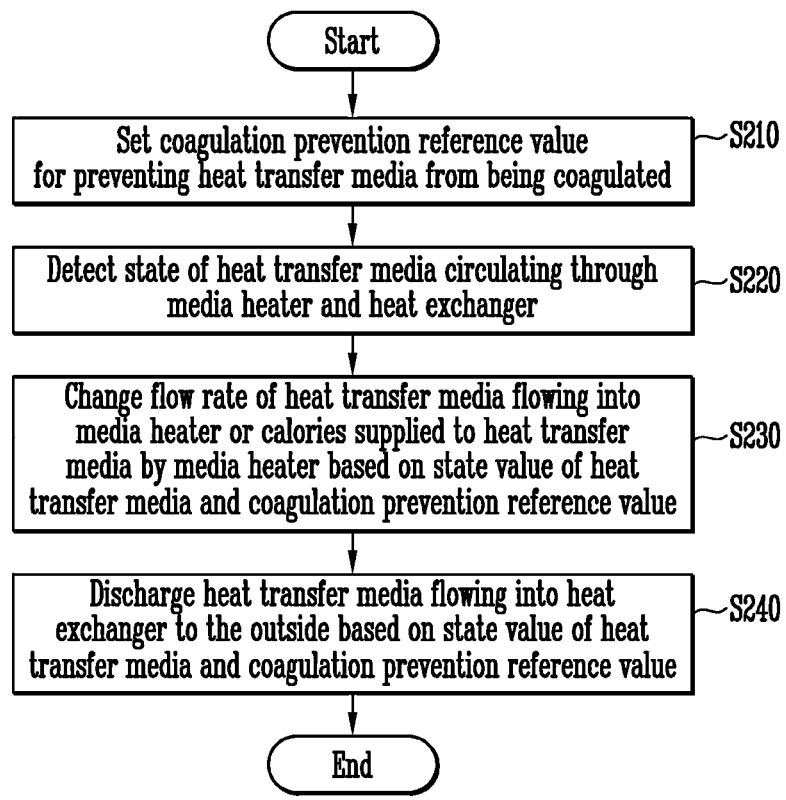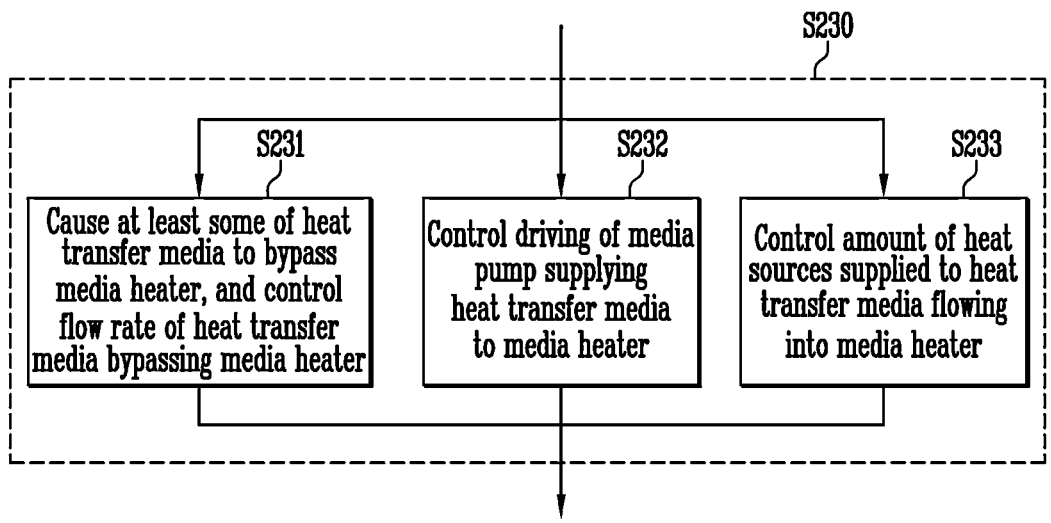

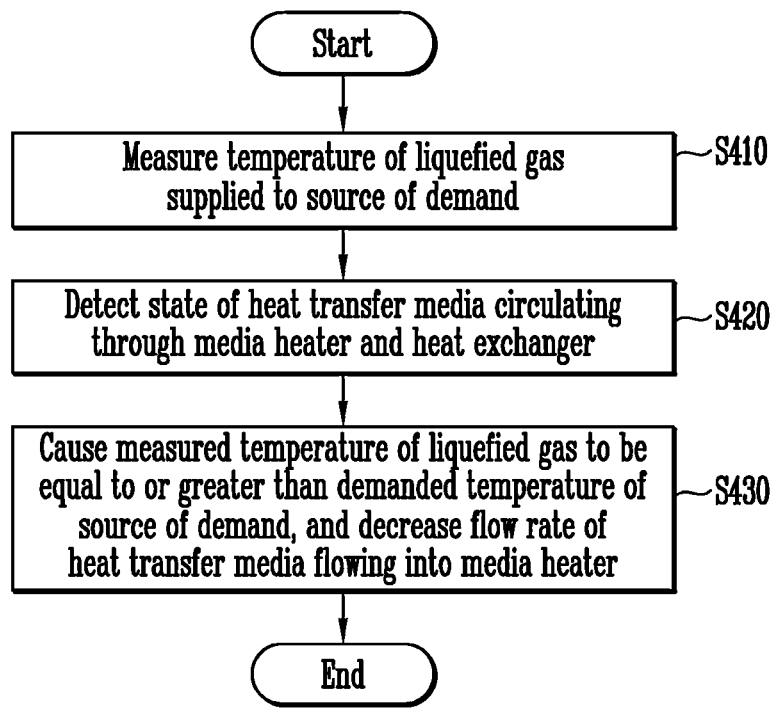
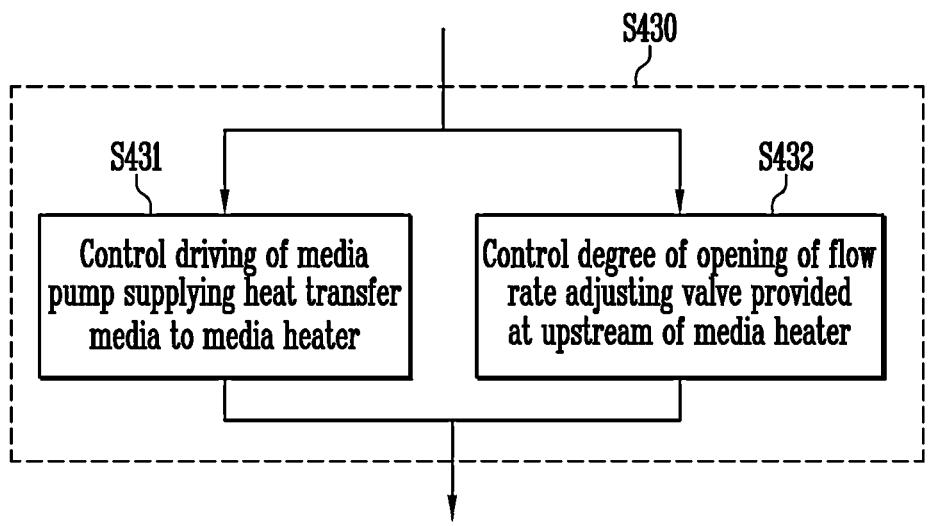

SYSTEM AND METHOD FOR PROCESSING LIQUEFIED GAS

CROSS-REFERENCE TO RELATED APPLICATIONS

This application is the U.S. National Stage of International Patent Application No. PCT/KR2013/004284 filed on May 14, 2013, which claims priority to Korean Patent Application No. 10-2012-0051047 filed on May 14, 2012, Korean Patent Application No. 10-2012-0146662 filed on Dec. 14, 2012, Korean Patent Application No. 10-2013-0054623 filed on May 14, 2013, and Korean Patent Application No. 10-2013-0054617 filed on May 14, 2013, the disclosures of which are hereby incorporated by reference in their entireties.

TECHNICAL FIELD

The present invention relates to a liquefied gas treatment system and method.

BACKGROUND ART

Recently, with the development of technologies, liquefied gas, such as liquefied natural gas and liquefied petroleum gas, has been widely used, instead of gasoline or diesel.

Liquefied natural gas is gas obtained by cooling and liquefying methane obtained by refining natural gas collected from a gas field, and is colorless and transparent liquid, and produces few pollutants and has a high calorific value, so that the liquefied natural gas is a very excellent fuel. On the other hand, the liquefied petroleum gas is a fuel obtained by compressing and liquefying gas, of which main components are propane ($C_3H_8$) and butane ($C_4H_{10}$), collected from an oilfield, together with petroleum at room temperature. The liquefied petroleum gas is colorless and odorless, similar to liquefied natural gas, and has been widely used as fuel for home, a business, an industry, and a vehicle.

The liquefied gas is stored in a liquefied gas storing tank installed on a ground, or a liquefied gas storing tank included in a vessel, which is a transportation means sailing the ocean, and a volume of the liquefied natural gas is decreased by $1/600$ by liquefaction, and a volume of propane is decreased by $1/260$ and a volume of butane is decreased by $1/230$ by liquefaction in liquefied petroleum gas, so that storage efficiency is high.

The liquefied gas is supplied to and used in various sources of demand, and an LNG fuel supply method of driving an engine by using LNG as fuel in an LNG carrying vessel carrying liquefied natural gas has been recently developed, and the method of using LNG as the fuel of the engine has been applied to other vessels, in addition to the LNG carrying carrier.

However, a temperature, a pressure, and the like of liquefied gas demanded by a source of demand, such as an engine, may be different from a state of liquefied gas stored in a liquefied storing tank. Accordingly, in recent days, technology of supplying LNG to a source of demand by controlling a temperature, a pressure, and the like of the liquefied gas stored in a liquid state has been continuously researched and developed.

DISCLOSURE

Technical Problem

The present invention is conceived to solve the aforementioned problems, and an object of the present invention is to provide a liquefied gas treatment system and method which calculates a target temperature of heat transfer media, which are heat exchanged with liquefied gas, through a measured temperature of the liquefied gas transmitted to the source of demand and controls a flow rate of the heat transfer media flowing into a media heater or the amount of heat sources supplied to the heat transfer media from the media heater based on the target temperature of the heat transfer media, thereby efficiently controlling a temperature of the liquefied gas supplied to the source of demand.

Another object of the present invention is to provide a liquefied gas treatment system and method, which enables liquefied gas to be supplied in a state appropriate to a demanded temperature of the source of demand through cascade control of calculating a target temperature of the heat transfer media based on a measured temperature of the liquefied gas and appropriately heating the heat transfer media at the target temperature of the heat transfer media.

Another object of the present invention is to provide a liquefied gas treatment system and method, which enables at least some of heat transfer media to bypass the media heater according to a target temperature of the heat transfer media, changes the amount of heat transfer media flowing into the media heater by driving a media pump supplying the heat transfer media to a media heater, or controls the amount of heat sources supplied to the media heater by the media heater, thereby easily controlling calories transmitted to the liquefied gas by the heat transfer media.

Another object of the present invention is to provide a liquefied gas treatment system and method, which detects a temperature of the heat transfer media at a downstream of the heat exchanger and controls a flow of the heat transfer media so as to prevent a temperature of the heat transfer media from being decreased to a predetermined temperature or lower in order to prevent water included in the heat transfer media and the like from being iced (icing phenomenon) due to supercooling of the heat transfer media due to the liquefied gas in the heat exchanger, thereby stably implementing the system.

Another object of the present invention is to provide a liquefied gas treatment system and method, which discharges heat transfer media flowing into the heat exchanger to the outside through a media discharge line as necessary in order to prevent generation of a problem in driving the system due to the icing phenomenon by cooling of the heat transfer media remaining in the heat exchanger by liquefied gas, thereby protecting the heat exchanger and the system.

Another object of the present invention is to provide a liquefied gas treatment system and method, which adjusts the amount of heat transfer media flowing into the media heater or the amount of heat sources supplied to the media heater in order to prevent water included in the heat transfer media and the like from being evaporated (cracking phenomenon) according to overheating of the heat transfer media in the media heater, thereby efficiently using the heat transfer media.

Another object of the present invention is to provide a liquefied gas treatment system and method, which maintains a sufficiently large difference between temperatures of the heat transfer media at the front and rear ends of the heat exchanger so that liquefied gas is heated to a demanded temperature of the liquefied gas of the source of demand, and decreases a circulation rate of the heat transfer media, thereby maximizing efficiency of the media pump.

Technical Solution

In accordance with an aspect of the present invention, there is provided a liquefied gas treatment system, including:

a liquefied gas supply line connected from a liquefied gas storing tank to a source of demand; a heat exchanger provided on the liquefied gas supply line between the source of demand and the liquefied gas storing tank and configured to exchange heat between the liquefied gas, supplied from the liquefied gas storing tank, and heat transfer media; a media heater configured to heat the heat transfer media; a media circulation line connected from the media heater to the heat exchanger; a media state detecting sensor provided on the media circulation line, and configured to measure a state of the heat transfer media; and a controller configured to set a gasification prevention reference value for preventing the heat transfer media from being gasified, and change a flow rate of the heat transfer media flowing into the media heater or calories supplied to the heat transfer media by the media heater on the basis of a state value of the heat transfer media by the media state detecting sensor and the gasification prevention reference value.

Particularly, the liquefied gas treatment system may further include: a phase separator provided at a downstream of the media heater on the media circulation line, and configured to detect gasification of the heat transfer media.

Particularly, the phase separator may discharge the gasified heat transfer media to the outside, and causes remaining heat transfer media to flow into the heat exchanger through the media circulation line.

Particularly, the media state detecting sensor may be provided at a downstream of the heat exchanger on the media circulation line to detect a temperature of the heat transfer media.

Particularly, the gasification prevention reference value is a temperature for preventing water included in the heat transfer media from being gasified.

Particularly, the controller may change the flow rate of the heat transfer media or the calories supplied to the heat transfer media so that the state value of the heat transfer media is equal to or lower than the gasification prevention reference value.

Particularly, the liquefied gas treatment system may further include: a branch line configured to cause at least some of the heat transfer media to be branched from the media circulation line and bypass the media heater, in which the controller may adjust the flow rate of the heat transfer media flowing into the branch line through a bypass adjusting valve provided on the branch line.

Particularly, the liquefied gas treatment system may further include: a media tank configured to store the heat transfer media; and a media pump configured to supply the heat transfer media stored in the media tank to the media heater, in which the controller controls the flow rate of the heat transfer media supplied to the media heater from the media pump by controlling driving of the media pump.

Particularly, the liquefied gas treatment system may further include: a heat source supply line configured to supply heat sources to the media heater; and a heat source supply valve provided on the heat source supply line and configured to adjust a degree of opening of the heat source supply line, in which the controller controls the amount of heat sources supplied to the heat transfer media by the media heater by controlling the degree of opening of the heat source supply valve.

Particularly, the liquefied gas treatment system may further include: a pump provided on the liquefied gas supply line and configured to pressurize the liquefied gas discharged from the liquefied gas storing tank, in which the heat exchanger exchanges heat between the liquefied gas supplied from the pump and the heat transfer media.

Particularly, the heat transfer media may be glycol water.

In accordance with another aspect of the present invention, there is provided a method of driving a liquefied gas treatment system which heats liquefied gas with heat transfer media in a heat exchanger, in such a manner that a media heater heats and supplies the heat transfer media to the heat exchanger, the method including: setting a gasification prevention reference value for preventing heat transfer media from being gasified; detecting a state of the heat transfer media; and changing a flow rate of the heat transfer media flowing into the media heater or calories supplied to the heat transfer media by the media heater on the basis of a state value of the heat transfer media and the gasification prevention reference value.

Particularly, the setting of the gasification prevention reference value may include setting a temperature for preventing water included in the heat transfer media from being gasified.

Particularly, the detecting of the state of the heat transfer media may include detecting a temperature of the heat transfer media at a downstream of the heat exchanger.

Particularly, the changing of the flow rate of the heat transfer media may include changing the flow rate of the heat transfer media or the calories supplied to the heat transfer media so that the state value of the heat transfer media is equal to or lower than the gasification prevention reference value.

Particularly, the changing of the flow rate of the heat transfer media may include causing at least some of the heat transfer media to bypass the media heater, in such a manner that the flow rate of the heat transfer media bypassing the media heater is controlled.

Particularly, the changing of the flow rate of the heat transfer media may include controlling driving of a media pump supplying the heat transfer media to the media heater.

Particularly, the changing of the calories supplied to the heat transfer media may include controlling an amount of heat sources supplied to the heat transfer media flowing into the media heater.

Advantageous Effects

According to the liquefied gas treatment system and method of the present invention, it is possible to induce a target temperature of heat transfer media through a measured temperature of liquefied gas at a rear end of the heat exchanger, adjust the amount of heat transfer media flowing into the media heater, and easily heat the heat transfer media at the target temperature, thereby enabling the liquefied gas to be supplied to a source of demand in a state appropriate to a demanded temperature of the source of demand.

Further, according to the liquefied gas treatment system and method of the present invention, it is possible to enable at least some of heat transfer media to bypass the media heater, change the amount of heat transfer media flowing into the media heater according to driving of the media pump, or control the amount of heat sources supplied to the media heater, thereby effectively controlling the temperature of the heat transfer media.

Further, according to the liquefied gas treatment system and method of the present invention, it is possible to control a degree of heating the heat transfer media based on a temperature of the heat transfer media detected in or downstream of the heat exchanger or at the downstream of the media heater in order to prevent water included in the heat transfer media from being frozen or evaporated, thereby implementing smooth circulation of the heat transfer media.

Further, according to the liquefied gas treatment system and method of the present invention, it is possible to enable the heat transfer media to be discharged from the heat exchanger along the media discharge line when the heat transfer media flowing into the heat exchanger are cooled more than needed by the liquefied gas, thereby preventing failure of the heat exchanger and shutdown of the system.

Further, according to the liquefied gas treatment system and method of the present invention, it is possible to decrease a circulation rate of the heat transfer media, sufficiently maintain a difference between temperatures of the heat transfer media at the front and rear ends of the heat exchanger, improve efficiency of circulation of the heat transfer media, and heat the liquefied gas at an appropriate temperature and supply the heated liquefied gas to the source of demand.

DESCRIPTION OF DRAWINGS

FIG. 3 is a flowchart of a liquefied gas treatment method according to a first embodiment of the present invention.

FIG. 4 is a detailed flowchart of step S130 of the liquefied gas treatment method according to the first embodiment of the present invention.

FIG. 5 is a flowchart of a liquefied gas treatment method according to a second embodiment of the present invention.

FIG. 6 is a detailed flowchart of step S230 of the liquefied gas treatment method according to the second embodiment of the present invention.

FIG. 9 is a flowchart of a liquefied gas treatment method according to a fourth embodiment of the present invention.

FIG. 10 is a detailed flowchart of step S430 of the liquefied gas treatment method according to the fourth embodiment of the present invention.

BEST MODE

Hereinafter, an exemplary embodiment of the present invention will be described in detail with reference to the accompanying drawings.

Figure 1:
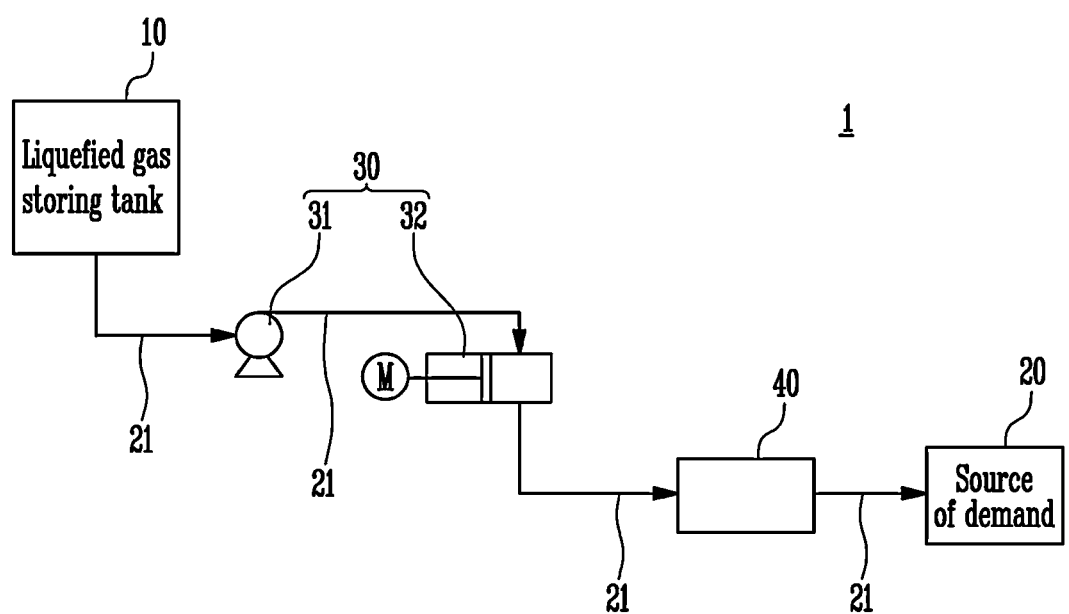
FIG. 1 is a conceptual diagram of a liquefied gas treatment system in the related art.

FIG. 1 is a conceptual diagram of a liquefied gas treatment system in the related art.

As illustrated in FIG. 1, a liquefied gas treatment system 1 in the related art includes a liquefied gas storing tank 10, a source of demand 20, a pump 30, and an electric heater 40. Hereinafter, in the present specification, liquefied gas may refer to all types of gas fuels, which are generally stored in a liquid state, such as LNG or LPG, ethylene, and ammonia, and even when liquefied gas is not in a liquid state by heating or pressurization, the liquefied gas may be expressed as liquefied gas for convenience. This is also applicable to boil-off gas.

The liquefied gas treatment system 1 in the related art uses the electric heater 40 receiving electrical energy to directly heat liquefied gas. However, the electrical energy necessary for driving the electric heater 40 may be obtained only by driving a generator (not shown) by using fuel, so that a cost problem due to fuel consumption, an environmental pollution problem by exhaust gas generated during fuel combustion, and the like may be generated.

Figure 2:
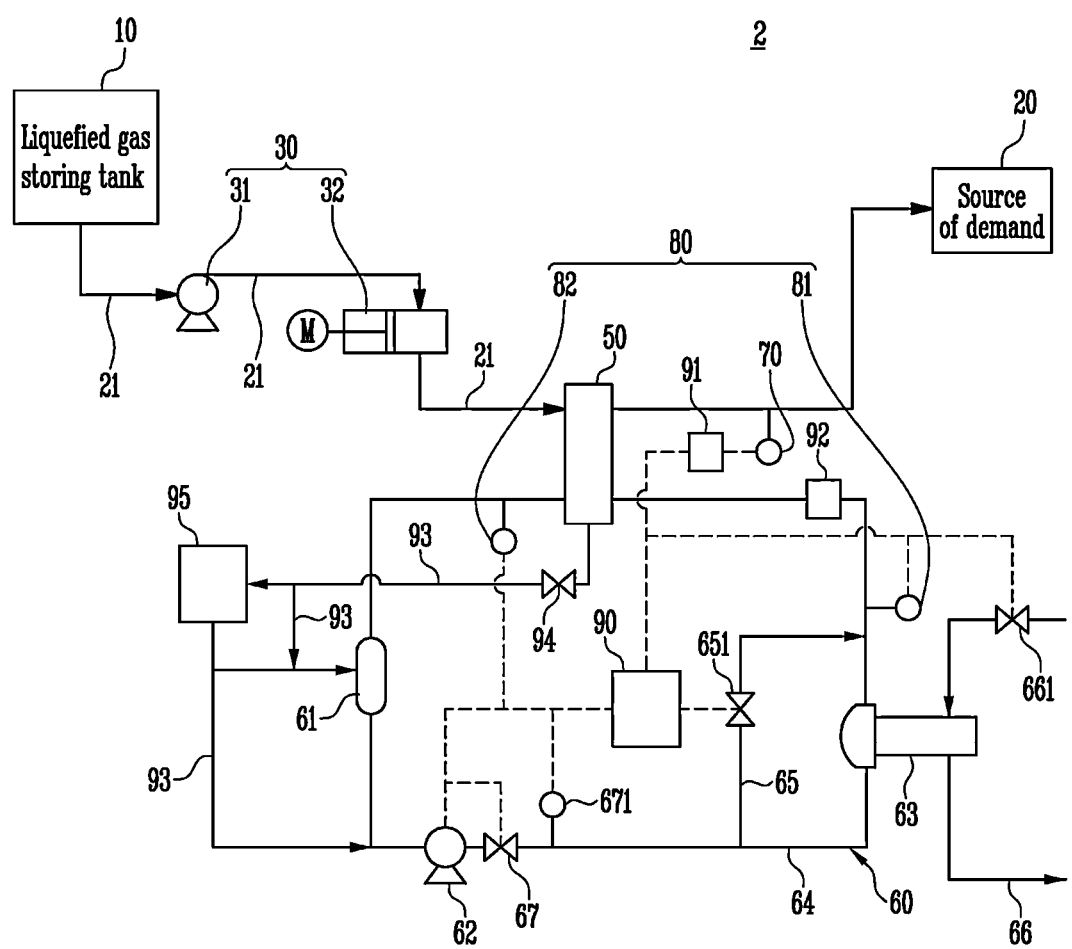
FIG. 2 is a conceptual diagram of a liquefied gas treatment system according to first to fourth embodiments of the present invention.

FIG. 2 is a conceptual diagram of a liquefied gas treatment system according to first to fourth embodiments of the present invention. In FIG. 2, a dotted line means a flow of transmission/reception of a signal.

As illustrated in FIG. 2, a liquefied gas treatment system 2 according to first to fourth embodiments of the present invention includes a liquefied gas storing tank 10, an engine 20, a pump 30, a heat exchanger 50, a media supply device 60, a liquefied gas temperature sensor 70, a media state detecting sensor 80, and a controller 90. In the embodiments of the present invention, the liquefied gas storing tank 10, the engine 20, the pump 30, and the like are denoted by the same reference numerals as those of the respective elements of the liquefied gas treatment system 1 in the related art for convenience, but do not necessarily designate the same elements.

The liquefied gas storing tank 10 stores liquefied gas to be supplied to the source of demand 20. The liquefied storing tank 10 needs to store the liquefied gas in a liquid state, and in this case, the liquefied gas storing tank 10 may have a form of a pressure tank.

The liquefied gas storing tank 10 includes an external tank (not shown), an internal tank (not shown), and an insulation part. The external tank, which has a structure forming an outer wall of the liquefied gas storing tank 10, may be formed of steel, and may have a cross section shaped like a polygon.

The internal tank is provided inside the external tank, and may be installed to be supported inside the external tank by a support (not shown). In this case, the support may be provided at a lower end of the internal tank, and may be provided at a side surface of the internal tank in order to prevent the internal tank from moving in a horizontal direction as a matter of course.

The internal tank may be formed of stainless steel, and may be designed so as to endure a pressure of 5 bars to 10 bars (for example, 6 bars). The liquefied gas contained inside the internal tank is evaporated and boil-off gas is generated, and thus an internal pressure of the internal tank may be increased. Therefore, the internal tank is designed so as to endure the predetermined pressure as described above.

The internal tank may have a baffle (not shown) therein. The baffle means a lattice-type plate, and when the baffle is installed, the pressure inside the internal tank is evenly distributed, thereby preventing a part of the internal tank from intensively receiving the pressure.

The insulation part may be provided between the internal tank and the external tank and may block external heat energy from being transferred to the internal tank. In this case, the insulation part may be in a vacuum state. When the insulation part is formed to be in the vacuum state, the liquefied gas storing tank 10 may more efficiently endure a high pressure compared to a general tank. For example, the liquefied gas storing tank 10 may endure a pressure of 5 bars to 20 bars through the vacuum insulation part.

As described above, in the present exemplary embodiments, the pressure tank-type liquefied gas storing tank 10 including the vacuum-type insulation part, which is provided between the external tank and the internal tank, is used, so that it is possible to minimize generation of boil-off gas, and it is possible to prevent an occurrence of a problem, such as damage to the liquefied gas storing tank 10, even when the internal pressure is increased.

The source of demand 20 receives the liquefied gas from the liquefied gas storing tank 10. The source of demand 20 may be an engine driven through the liquefied gas to generate power, and for example, an MEGI engine or a dual fuel engine mounted in a vessel.

In a case where the source of demand 20 is a dual fuel engine, LNG, which is liquefied gas, is not mixed with oil to be supplied, but LNG or oil may be selectively supplied. The reason is that two materials having different combustion temperatures are prevented from being mixed and supplied to prevent deterioration of efficiency of the engine.

In the engine, a piston (not shown) inside a cylinder (not shown) reciprocates by the combustion of the liquefied gas, so that a crank shaft (not shown) connected to the piston may be rotated, and a shaft (not shown) connected to the crank shaft may be rotated. Accordingly, when the engine is driven, a propeller (not shown) connected to the shaft is finally rotated, so that a ship body moves forward or backward.

In the present exemplary embodiments, the engine, which is the source of demand 20, may be an engine for driving the propeller, but may be an engine for generating electricity or other engines for generating power as a matter of course. In other words, in the present embodiments, the type of engine is not particularly limited. However, the engine may be an internal combustion engine for generating driving power by combustion of the liquefied gas.

A liquefied gas supply line 21 for transferring the liquefied gas may be installed between the liquefied gas storing tank 10 and the source of demand 20, and the pump 30, the heat exchanger 50, and the like may be provided in the liquefied gas supply line 21, so that the liquefied gas may be supplied to the source of demand 20.

In this case, a liquefied gas supply valve (not shown) may be installed in the liquefied gas supply line 21, so that the amount of liquefied gas supplied may be adjusted according to a level of opening the liquefied gas supply valve.

Further, the liquefied gas temperature sensor 70 is provided in the liquefied gas supply line 21, and in the present exemplary embodiments, cascade control of calculating a target temperature of heat transfer media supplying heat to the liquefied gas according to a temperature of the liquefied gas, appropriately changing the temperature of the heat transfer media heated through a media heater 63, and causing the heat transfer media to reach the target temperature may be implemented. This will be described below.

The pump 30 is provided on the liquefied gas supply line 21 and pressurizes the liquefied gas discharged from the liquefied gas storing tank 10. The pump 30 may include a boosting pump 31 and a high pressure pump 32.

The boosting pump 31 may be provided on the liquefied gas supply line 21 between the liquefied gas storing tank 10 and the high pressure pump 32 or inside the liquefied gas storing tank 10, and may supply the sufficient amount of liquefied gas to the high pressure pump 32 to prevent cavitation of the high pressure pump 32. Further, the boosting pump 31 may take out the liquefied gas from the liquefied gas storing tank 10 and pressurize the liquefied gas to several to several tens of bars, and the liquefied gas passing through the boosting pump 31 may be pressurized to 1 bar to 25 bars.

The liquefied gas stored in the liquefied gas storing tank 10 is in a liquid state. In this case, the boosting pump 31 may slightly increase the pressure and the temperature of the liquefied gas by pressurizing the liquefied gas discharged from the liquefied gas storing tank 10, and the liquefied gas pressurized by the boosting pump 31 may still be in a liquid state.

The high pressure pump 32 pressurizes the liquefied gas discharged from the boosting pump 31 at a high pressure, so that the liquefied gas is supplied to the source of demand 20. The liquefied gas is discharged from the liquefied gas storing tank 10 at a pressure within approximately 10 bars, and then is primarily pressurized by the boosting pump 31, and the high pressure pump 32 secondarily pressurizes the liquid-state liquefied gas pressurized by the boosting pump 31 to supply the pressurized liquefied gas to the heat exchanger 50 to be described below.

In this case, the high pressure pump 32 pressurizes the liquefied gas to a pressure demanded by the source of demand 20, for example, 200 bars to 400 bars, to supply the pressurized liquefied gas to the source of demand 20, thereby enabling the source of demand 20 to generate power through the liquefied gas.

The high pressure pump 32 pressurizes the liquid-state liquefied gas discharged from the boosting pump 31 with a high pressure and may phase-change the liquefied gas to be in a supercritical state having a higher temperature and a higher pressure than a critical point. In this case, the temperature of the liquefied gas in the supercritical state may be relatively higher than a critical temperature.

Otherwise, the high pressure pump 32 pressurizes the liquid-state liquefied gas with a high pressure to change the liquid-state liquefied gas to be in a supercooled liquid state. Here, the supercooled liquid state of the liquefied gas means a state in which the pressure of the liquefied gas is higher than a critical pressure, and the temperature of the liquefied gas is lower than the critical temperature.

Specifically, the high pressure pump 32 pressurizes the liquid-state liquefied gas discharged from the boosting pump 31 with a high pressure to 200 bars to 400 bars, in such a manner that the temperature of the liquefied gas is lower than the critical temperature, thereby phase-changing the liquefied gas to be in the supercooled liquid state. Here, the temperature of the liquefied gas in the supercooled state may be −140° C. to −60° C., which is relatively lower than the critical temperature.

However, the high pressure pump 32 may be omitted when the source of demand 20 is a low pressure engine. In other words, when the source of demand 20 is a dual fuel engine, which is a lower pressure engine, the liquefied gas may be pressurized by the boosting pump 31, and may then be supplied to the source of demand 20 through the heat exchanger 50 to be described below.

The heat exchanger 50 is provided on the liquefied gas supply line 21 between the source of demand 20 and the pump 30, and heat-exchanges the liquefied gas supplied from the pump 30 with the heat transfer media and supplies the heat-exchanged liquefied gas to the source of demand 20. The pump 30 for supplying the liquefied gas to the heat exchanger 50 may be the high pressure pump 32, and the heat exchanger 50 may heat the liquefied gas in the supercooled liquid state or the supercritical state while maintaining 200 bars to 400 bars, which are pressures discharged from the high pressure pump 32, convert the liquefied gas in the supercooled liquid state or the supercritical state into the liquefied gas in the supercritical state at 30° C. to 60° C., and then supply the converted liquefied gas to the source of demand 20.

In the embodiment, the heat exchanger 50 may heat the liquefied gas by using the heat transfer media supplied from the media heater 63 to be described below. In this case, the heat transfer media may be glycol water, and the glycol water is a fluid in which ethylene glycol is mixed with water and may be heated by the media heater 63, cooled by the heat exchanger 50, and circulated along a media circulation line 64.

A temperature of the heat transfer media, which is heat-exchanged with the liquefied gas in the heat exchanger 50 and then discharged, may be changed according to the aforementioned phase change of the liquefied gas of the high pressure pump 32. In other words, when the high pressure pump 32 phase changes the liquefied gas to be in the supercooled liquid state and then supplies the phase changed liquefied gas to the heat exchanger 50, the heat transfer media may be cooled while heating the liquefied gas in the supercooled liquid state to 30° C. to 60° C., or when the high pressure pump 32 phase changes the liquefied gas to be in the supercritical state and then supplies the phase changed liquefied gas to the heat exchanger 50, the heat transfer media may be cooled while heating the supercritical state liquefied gas, which has a higher temperature than that of the supercooled liquid state, to a demanded temperature of the source of demand 20. In this case, the heat transfer media in a case of being heat exchanged with the liquefied gas in the supercooled liquid state may be cooled to a lower temperature than that of the heat transfer media in a case of being heat exchanged with liquefied gas in the supercritical state and then circulated into a media tank 61.

When the liquefied gas discharged from the heat exchanger 50 does not reach or is excessively higher than the temperature demanded by the source of demand 20, in the present embodiment, a target temperature of the heat transfer media is calculated according to the measured temperature of the liquefied gas, and the heat transfer media are heated to the target temperature of the heat transfer media by causing at least a part of the heat transfer media to bypass, adjusting a flow rate of the heat transfer media by a media pump 62, or adjusting a quantity of heat sources supplied to the media heater 63, thereby controlling the temperature of the liquefied gas to be appropriate to the demanded temperature of the liquefied gas of the source of demand 20. The cascade control will be described below.

However, when the temperature of the heat transfer media, which is heat-exchanged with the liquefied gas in the heat exchanger 50, is lower than a freezing temperature of water at a specific pressure, water included in the heat transfer media is frozen, so that the heat transfer media are separated into water and ethylene glycol. However, in the embodiment, the temperature of the heat transfer media is detected in or downstream of the heat exchanger 50, and a heating flow of the heat transfer media is controlled through the detected temperature, thereby preventing water from being separated from the heat transfer media.

The media supply device 60 supplies the heat transfer media to the heat exchanger 50. The media supply device 60 includes the media tank 61, the media pump 62, the media heater 63, the media circulation line 64, a branch line 65, a heat source supply line 66, and a flow rate adjusting valve 67.

The media tank 61 stores the heat transfer media. The heat transfer media may be glycol water as described above, and the media tank 61 may store the heat transfer media at a temperature at which cracking (a phenomenon in which water and ethylene glycol are separated due to a phase change of water) of the glycol water may be prevented.

The media pump 62 is provided at a downstream of the media tank 61, so that the predetermined amount of heat transfer media may flow into the media heater 63 from the media tank 61 by the media pump 62. Further, the heat exchanger 50 is connected to an upstream of the media tank 61, so that the heat transfer media, which is cooled after supplying heat to the liquefied gas, may flow into the media tank 61 again.

The media tank 61, the media pump 62, the media heater 63, and the heat exchanger 50 may be connected with each other by the media circulation line 64. In other words, the heat transfer media may move sequentially from the media tank 61 through the media pump 62 and the media heater 63 to the heat exchanger 50 while moving along the media circulation line 64 to be heated or cooled.

The media pump 62 supplies the heat transfer media stored in the media tank 61 to the media heater 63. The media pump 62 may be provided at the downstream of the media tank 61, and the number of media pumps 62 may be plural, so that when any one of the media pumps 62 is damaged, the heat transfer media may be smoothly supplied through another media pump 62.

Driving of the media pump 62 may be controlled by the controller 90 to be described below to control a flow rate of the heat transfer media supplied to the media heater 63. A driving speed (RPM), a pressure, and the like of the media pump 62 may be changed by the controller 90, which means that a flow rate of the heat transfer media flowing into the media heater 63 is finally changed.

In the present embodiment, it is possible to decrease a flow rate of the circulated liquefied gas by minimizing the operation of the media pump 62 within a limit in which the heated liquefied gas is appropriate to the demanded temperature of the liquefied gas of the source of demand 20 when the liquefied gas is heated by the heat exchanger 50, it is possible to improve efficiency of the media pump 62, and the like, and decrease energy consumption.

The media heater 63 heats the heat transfer media discharged from the media tank 61 and then supplies the heated heat transfer media to the heat exchanger 50. The media heater 63 heats the heat transfer media at a predetermined temperature, so that the heat transfer media may enable the heat exchanger 50 to supply sufficient heat to the liquefied gas.

The media heater 63 may heat the heat transfer media by using electrical energy. However, the mediate heater 63 may use steam in the present embodiment. In other words, the heat source supply line 66 for supplying a heat source is connected to the media heater 63, and the heat source supply line 66 supplies steam generated by a boiler (not shown) to the media heater 63, the steam supplies heat to the heat transfer media, and the heat transfer media cool the steam, so that the heat transfer media may be heated, and the steam may be condensed to condensed water.

In this case, the condensed water may flow into the boiler again through a condensed water tank (not shown), be changed to steam, and then flow into the media heater 63 again, and the heat transfer media heated by the steam may be discharged from the media heater 63 to flow into the heat exchanger 50.

The media circulation line 64 is connected from the media heater 63 to the heat exchanger 50 to circulate the heat transfer media. The heat transfer media may be heated in the media heater 63 while being circulated along the media circulation line 64, and may be cooled by the liquefied gas in the heat exchanger 50.

Further, the media circulation line 64 connects the media tank 61, the media pump 62, the media heater 63, and the heat exchanger 50 so as to cause the heat transfer media to be circulated. Accordingly, in the present embodiment, the heat transfer media are re-used, thereby improving efficiency.

The branch line 65 causes at least some of the heat transfer media to be branched from the media circulation line to bypass the media heater 63. The branch line 65 may be branched at an upstream point of the media heater 63 on the media circulation line 64 to be joined at a downstream point of the media heater 63.

The heat transfer media bypassing the media heater 63 through the branch line 65 and the heat transfer media flowing into the media heater 63 through the media circulation line 64 without flowing into the branch line 65 may be joined at the downstream of the media heater 63, and in this case, the temperature of the heat transfer media bypassing the media heater 63 may be lower than the temperature of the heat transfer media heated by the media heater 63.

In this case, when a flow rate of the heat transfer media bypassing the media heater 63 is adjusted, the temperature of the heat transfer media flowing into the heat exchanger 50 may be effectively controlled. In other words, in the present embodiment, some of the heat transfer media bypasses the media heater 63 and is then joined, so that the temperature of the heat transfer media may be changed.

The branch line 65 may include a bypass adjusting valve 651. A degree of opening of the bypass adjusting valve 651 is controlled by the controller 90 to be described below, thereby adjusting a flow rate of the heat transfer media flowing into the branch line 65. The bypass adjusting valve 651 may be a 2-way valve provided on the branch line 65, and a detailed flow of the heat transfer media moving through the branch line 65 will be described below.

The heat source supply line 66 supplies a heat source to the media heater 63. In this case, the heat sources, which heat the heat transfer media and cause the heated heat transfer media to heat the liquefied gas, may be steam. In other words, the heat source supply line 66 may be a steam supply line. A heat source supply valve 661 may be provided on the heat source supply line 66.

The heat source supply valve 661 may adjust a degree of opening of the heat source supply line 66, and the amount of steam flowing along the heat source supply line 66 is controlled by the heat source supply valve 661, and a temperature of the heat transfer media heated by the media heater 63 may be changed. The heat source supply valve 661 is controlled by the controller 90, so that it is possible to prevent a cracking phenomenon in which the heat transfer media are gasified so that a material included in the heat transfer media (water in a case where the heat transfer media are glycol water) is separated.

The flow rate adjusting valve 67 is provided on the media circulation line 64 and adjusts a flow rate of the heat transfer media flowing into the media heater 63. The flow rate adjusting valve 67 may be provided at the downstream of the media pump 62, and a degree of opening thereof may be controlled by the controller 90, thereby changing the flow rate of the heat transfer media circulating through the media circulation line 64.

In this case, a media flow rate sensor 671 for measuring a flow rate of the heat transfer media flowing into the media heater 63 may be provided at one side of the flow rate adjusting valve 67. The media flow rate sensor 671 may be provided on the media circulation line 64. The media flow rate sensor 671 measures a flow rate of the heat transfer media circulating in the media circulation line 64 and transmits the measured flow rate to the controller 90, thereby causing the controller 90 to appropriately adjust the degree of opening of the flow rate adjusting valve 67.

The liquefied gas temperature sensor 70 is provided on the liquefied gas supply line 21 and measures a temperature of the liquefied gas. The liquefied gas temperature sensor 70 may be provided between the heat exchanger 50 and the source of demand 20 on the liquefied gas supply line 21 and may measure the temperature of the liquefied gas after being heated by the heat transfer media in the heat exchanger 50.

The measured temperature of the liquefied gas may be compared with the demanded temperature of the liquefied gas of the source of demand 20 by the controller 90 to be described below, and a target temperature calculator 91 of the controller 90 may calculate the target temperature of the heat transfer media through the comparison. This will be described below.

The media state detecting sensor 80 is provided on the media circulation line 64 and measures a state of the heat transfer media. The media state detecting sensor 80 may include a first media state detecting sensor 81 for detecting a temperature of the heat transfer media at the downstream of the media heater 63, and a second media state detecting sensor 82 for detecting the temperature of the heat transfer media downstream of or in the heat exchanger 50.

The first media state detecting sensor 81 is provided at the downstream of the media heater 63 on the media circulation line 64 and may measure a temperature of the heat transfer media heated by the media heater 63. The heat transfer media, detected by the first media state detecting sensor 81, mean the heat transfer media after being heated by the media heater 63 and include heat to be supplied to the liquefied gas by the heat exchanger 50.

When the temperature of the heat transfer media detected by the first media state detecting sensor 81 is low, the temperature of the liquefied gas, which is heated by receiving heat from the heat transfer media by the heat exchanger 50, is also low, but when the temperature of the heat transfer media detected by the first media state detecting sensor 81 is high, the temperature of the liquefied gas discharged from the heat exchanger 50 may also be high.

In other words, the temperature detected by the first media state detecting sensor 81 may be a value, through which the temperature of the liquefied gas supplied to the source of demand 20 from the heat exchanger 50 is predictable, and in the present embodiment, the temperature of the heat transfer media may be changed so that the temperature of the liquefied gas corresponds to the demanded temperature of the source of demand 20 through the detected temperature. The temperature of the heat transfer media may be adjusted by the aforementioned branch line 65, media pump 62, and heat source supply valve 661.

The first media state detecting sensor 81 may be provided at an upstream of a point at which the heat transfer media bypassing on the media circulation line 64 through the branch line 65 are joined. In this case, the first media state detecting sensor 81 detects a temperature of the heat transfer media discharged from the media heater 63, and the detected temperature may be used so as to prevent the cracking phenomenon from occurring in the heat transfer media by gasification of the heat transfer media.

The first media state detecting sensor 81 may also be provided at a downstream of the point at which the heat transfer media bypassing on the media circulation line 64 through the branch line 65 are joined. In this case, a difference between the temperatures detected by the first media state detecting sensor 81 and the second media state detecting sensor 82 means calories supplied to the liquefied gas from the heat exchanger 50.

The second media state detecting sensor 82 may be provided at the downstream of the heat exchanger 50 on the media circulation line 64 or inside the heat exchanger 50, to detect a temperature of the heat transfer media. The temperature of the heat transfer media detected by the second media state detecting sensor 82 means a temperature of the heat transfer media cooled by the liquefied gas in the heat exchanger 50.

When the temperature, detected by the second media state detecting sensor 82, is excessively low, a material (for example, water) included in the heat transfer media may be coagulated. Therefore, in the present embodiment, the temperature detected by the second media state detecting sensor 82 is compared with a coagulation prevention reference value, thereby preventing an icing phenomenon of the heat transfer media.

Further, the media state detecting sensor 80 may detect a difference between the temperatures of the heat transfer media at front and rear ends of the heat exchanger 50 by using the first media state detecting sensor 81 and the second media state detecting sensor 82. In this case, the difference between the temperatures of the heat transfer media is transmitted to the controller 90, and the controller 90 causes the difference between the temperatures of the heat transfer media to be a predetermined value or more, so that the liquefied gas may be sufficiently heated to the demanded temperature of the liquefied gas of the source of demand 20. In this case, the controller 90 may improve efficiency of the media pump 62 by decreasing the flow rate of the heat transfer media within a limit in which the difference between the temperatures of the heat transfer media is equal to or greater than the predetermined value.

The controller 90 changes the flow rate of the heat transfer media flowing into the media heater 63 or the calories supplied to the heat transfer media by the media heater 63. Hereinafter, control of the controller 90 will be described for each embodiment.

In a first embodiment of the present invention, the controller 90 may change a flow rate of the heat transfer media or calories supplied to the heat transfer media based on the measured temperature of the liquefied gas. Specifically, the controller 90 may include the target temperature calculator 91 for calculating a target temperature of the heat transfer media by using the measured temperature of the liquefied gas, and may change a flow rate, and the like of the heat transfer media based on the target temperature of the heat transfer media.

In other words, the controller 90 may directly control the flow rate and the like of the heat transfer media by using the measured temperature of the liquefied gas, or may calculate a target temperature of the heat transfer media based on the measured temperature of the liquefied gas and then control the flow rate of the heat transfer media by using the target temperature of the heat transfer media. The latter is referred to as cascade control.

In this case, the target temperature calculator 91 may calculate the target temperature of the heat transfer media through PID control using a deviation between the demanded temperature of the liquefied gas of the source of demand 20 and the measured temperature of the liquefied gas. The PID control is to output the temperature of the heat transfer media by using a proportional term of a deviation, an integral term meaning an accumulation value of deviations, and a derivative term meaning a difference between a current deviation and a past deviation, and a detailed calculation formula of the PID control is a general matter, so that a detailed description thereof will be omitted.

The target temperature calculator 91 may calculate the target temperature of the heat transfer media by using the measure temperature of the liquefied gas at a predetermined time interval or in real time through the PID control, and the target temperature of the heat transfer media may be transmitted to the controller 90.

For example, when the liquefied gas is LNG and the source of demand 20 is the engine, and the demanded temperature of the liquefied gas of the source of demand 20 is 45° C. and the measured temperature of the current liquefied gas is 50° C., the target temperature of the heat transfer media may be calculated based on 5° C. which is a deviation between the measured temperature of the current liquefied gas and the demanded temperature of the liquefied gas of the source of demand 20. For example, the target temperature of the heat transfer media is calculated as 60° C., and whether the temperature of the heat transfer media reaches the target temperature may be identified by the media state detecting sensor 80 (particularly, the first media state detecting sensor 81).

As the temperature of the heat transfer media is close to the target temperature, the measured temperature of the liquefied gas may be changed. When the temperature of the heat transfer media is close to 60° C. to be decreased, the measured temperature of the liquefied gas may be 43° C., which is lower than 45° C. In this case, the target temperature calculator 91 re-calculates the temperature of the heat transfer media through the PID control and may cause the temperature of the heat transfer media to be, for example, 62° C. As described above, considering that the temperature of the liquefied gas is changed again according to the change in the temperature of the heat transfer media, the target temperature calculator 91 may calculate the target temperature of the heat transfer media at a predetermined time interval or in real time, and as a result, the liquefied gas may converge on the demanded temperature of the liquefied gas of the source of demand 20.

However, the target temperature of the heat transfer media may be positioned within a predetermined temperature range of the heat transfer media. For example, the temperature range of the heat transfer media is 45° C. to 85° C. and may be a value set by an input.

Otherwise, the target temperature calculator 91 may calculate the target temperature of the heat transfer media based on the measured temperature of the liquefied gas by using a demanded temperature range of the liquefied gas of the source of demand 20 and the temperature range of the heat transfer media. In this case, each temperature range may be a predetermined value.

For example, in a case where a temperature range of the demanded temperature of the liquefied gas of the source of demand 20 is 40° C. to 60° C. (an interval of 20° C.), and a temperature range of the heat transfer media is 45° C. to 85° C. (an interval of 40° C.), the temperature of the heat transfer media may correspond to 51° C. by a range proportional conversion when the measured temperature of the liquefied gas is 43° C. (The measured temperature is higher than the lowest temperature of the temperature range by 3° C., and a temperature higher than the lowest temperature by 6° C. is applied when reflecting to the temperature range of the heat transfer media.). Thus, the target temperature calculator 91 may also calculate the target temperature of the heat transfer media through the proportional conversion considering the temperature range.

The controller 90 may control the flow rate of the heat transfer media supplied to the media heater 63 from the media pump 62 by controlling the driving of the media pump 62 based on the target temperature of the heat transfer media calculated by the target temperature calculator 91, or may adjust the flow rate of the heat transfer media flowing into the branch line 65 through the bypass adjusting valve 651 provided on the branch line 65.

Specifically, when the target temperature is higher than the current temperature of the heat transfer media, the controller 90 may increase calories, which the heat transfer media may supply to the liquefied gas in the heat exchanger 50, by supplying the large amount of heat transfer media to the media heater 63 by increasing RPM, and the like of the media pump 62, or decreasing the flow rate of the heat transfer media bypassing to the branch line 65. When the target temperature is lower than the current temperature of the heat transfer media, control opposite to the aforementioned control may be performed as a matter of course.

In this case, in a case of controlling the media pump 62, target calories of the heat transfer media may be calculated considering the target temperature calculated by the target temperature calculator 91, the flow rate of the heat transfer media detected by the media flow rate sensor 671, and a flow rate of the liquefied gas (which may be detected by a separate liquefied gas flow rate sensor (not shown)) together, and the media pump 62 may also be controlled according to the target calories. The reason is to prepare a case where the temperature of the heat transfer media heated by the heat sources by the media heater 63 is uniform regardless of the flow rate.

In other words, even though the heat transfer media reaches the target temperature by the media heater 63 to flow into the heat exchanger 50, the liquefied gas may not reach the demanded temperature of the liquefied gas of the source of demand 20. The reason is that the flow rate of the heat transfer media is insufficient.

Accordingly, the target temperature calculator 91 may calculate the target calories of the heat transfer media considering the flow rate of the liquefied gas and the flow rate of the heat transfer media, and the driving of the media pump 62 may be controlled based on the target calories of the heat transfer media.

In addition, the controller 90 may change a heating temperature of the heat transfer media by controlling the amount of heat sources, which the media heater 63 supplies to the heat transfer media, by adjusting a degree of opening of the heat source supply valve 661 provided in the heat source supply line 66. In other words, the controller 90 may adjust a degree of opening of the heat source supply valve 661 so as to increase the amount of heat sources supplied when the target temperature is higher than the current temperature of the heat transfer media, and to decrease the amount of heat sources when the target temperature is lower than the current temperature of the heat transfer media.

Further, the controller 90 may return at least some of the heat transfer media, which flows from the media pump 62 to the media heater 63, to the media tank 61 or the media pump 62, thereby changing the amount of heat transfer media flowing into the media heater 63. The controller 90 in the present embodiment is not limited to the aforementioned contents, and any control may be adopted as long as the control may change the flow rate of the heat transfer media supplied to the media heater 63.

As described above, in the present embodiment, the target temperature of the heat transfer media is calculated by using the measured temperature of the liquefied gas, and the flow of the heat transfer media is controlled by the calculated target temperature of the heat transfer media, thereby efficiently heating the liquefied gas to have the demanded temperature of the liquefied gas of the source of demand 20.

In a second embodiment of the present invention, the controller 90 sets a coagulation prevention reference value for preventing the heat transfer media from being coagulated (the material included in the heat transfer media may be coagulated), and changes the flow rate of the heat transfer media flowing into the media heater 63 or the calories supplied to the heat transfer media by the media heater 63, based on a state value of the heat transfer media by the media state detecting sensor 80 and the coagulation prevention reference value.

The heat transfer media may be glycol water as described above and may include water. When the heat transfer media are supercooled to a predetermined temperature or low during a process of being cooled by the liquefied gas in the heat exchanger 50, water included in the heat transfer media is frozen. As a result, the heat transfer media may not be used.

Accordingly, the controller 90 may previously set the coagulation prevention reference value for preventing the water included in the heat transfer media from being frozen. The coagulation prevention reference value may be, for example, 30° C., but is not limited thereto, and may be changed according to a pressure or a flow rate of the heat transfer media or the liquefied gas.

The controller 90 may change the flow rate of the heat transfer media and the like so that the state value of the heat transfer media is equal to or greater than the coagulation prevention reference value. In this case, the state value of the heat transfer media means a state value by the second media state detecting sensor 82, that is, a temperature of the heat transfer media cooled in the heat exchanger 50.

The controller 90 may prevent an icing phenomenon that water included in the heat transfer media is frozen by causing the temperature of the heat transfer media cooled in the heat exchanger 50 to be equal to or greater than the coagulation prevention reference value.

To this end, the controller 90 may cause the state value of the heat transfer media to be equal to or greater than the coagulation prevention reference value by changing the flow rate of the heat transfer media supplied to the media heater 63 or the calories supplied to the heat transfer media by controlling the bypass adjusting valve 651 provided in the branch line 65, controlling the driving of the media pump 62, or controlling the heat source supply valve 661.

Specifically, when the temperature of the heat transfer media is lower than the coagulation prevention reference value, the controller 90 may increase the temperature of the heat transfer media or the calories by decreasing a degree of opening of the bypass adjusting valve 651 (the heat transfer media have a sufficient temperature when the heat transfer media bypassing the media heater 63 are joined with the heat transfer media heated by the media heater 63, thereby preventing the icing phenomenon), increasing RPM of the media pump 62 (when it is assumed that the media heater 63 supplies sufficient heat resources, the icing phenomenon is prevented by increasing the total calories which the heat transfer media are receivable), and increasing a degree of opening of the heat source supply valve 661.

Accordingly, in the present embodiment, even though the heat transfer media are cooled by the liquefied gas in the heat exchanger 50, the temperature of the heat transfer media or the calories are sufficiently increased so as to prevent the icing phenomenon from being generated, so that the heat transfer media may be smoothly circulated.

However, when the heat transfer media flowing into the heat exchanger 50 fail to be discharged along the media circulation line 64 from the heat exchanger 50 due to an unexpected reason, the heat transfer media are cooled by the liquefied gas continuously flowing into the heat exchanger 50, so that the icing phenomenon may be generated.

Accordingly, in the present embodiment, the present invention may further include a media discharge line 93 for preventing the icing phenomenon from being generated in the heat transfer media flowing into the heat exchanger 50 when the circulation of the heat transfer media is not smooth, preventing the heat exchanger 50 from being damaged due to the heat transfer media in which the icing phenomenon is generated, or preventing a system from being stopped.

The media discharge line 93 is connected to the heat exchanger 50 to discharge the heat transfer media flowing into the heat exchanger 50 to the outside. When the media are normally circulated by the aforementioned control of the controller 90, the icing phenomenon is not generated in the heat transfer media in the heat exchanger 50. However, when the heat transfer media fail to be discharged and remain in the heat exchanger 50 due to generation of a problem in the media circulation, the icing phenomenon may be generated in the heat transfer media by cold energy of the liquefied gas continuously supplied to the heat exchanger 50.

Accordingly, in the present embodiment, the media discharge line 93 is provided at one side of the heat exchanger 50, and when it is detected that a problem is generated in the media circulation, the heat transfer media remaining in the heat exchanger 50 may be discharged to the outside.

In this case, a media discharge valve 94 may be further provided on the media discharge line 93. The media discharge valve 94 is provided on the media discharge line 93, and a degree of opening of the media discharge valve 94 may be adjusted based on the state value of the heat transfer media by the media state detecting sensor 80 (particularly, the second media state detecting sensor 82), and the coagulation prevention reference value.

The second media state detecting sensor 82 is provided downstream of or in the heat exchanger 50, so that when the temperature of the heat transfer media cooled in the heat exchanger 50 is compared with the coagulation prevention reference value, and the temperature of the heat transfer media is lower than the coagulation prevention reference value, a degree of opening of the media discharge valve 94 is increased, thereby discharging the heat transfer media to the media discharge line 93.

When the temperature of the heat transfer media is so low there is a risk of system stoppage due to the icing phenomenon, the degree of opening of the media discharge valve 94 may be controlled, because there is a problem in heating the liquefied gas when the heat transfer media are discharged along the media discharge line 93 by the media discharge valve 94.

The media discharge line 93 may transmit the heat transfer media discharged from the heat exchanger 50 to a separate media processing facility (not shown), and in this case, the separate media processing facility may throw away the heat transfer media discharged from the heat exchanger 50, or heat and cause the heat transfer media to be discharged from the heat exchanger 50 flow into the circulation line 64 again.

Otherwise, the media discharge line 93 has one end connected to the heat exchanger 50, and the other end connected to the media tank 61, to collect the heat transfer media flowing into the heat exchanger 50 to the media tank 61. Accordingly, the heat transfer media may be re-circulated along the media tank 61, the media pump 62, and the media heater 63 to be used.

Otherwise, the media discharge line 93 has one end connected to the heat exchanger 50, and the other end connected in or upstream of the media pump 62, to supply the heat transfer media flowing into the heat exchanger 50 to the media pump 62. In this case, similar to the aforementioned case, the heat transfer media may be re-used.

However, the heat transfer media discharged along the media discharge line 93 may have a low temperature to have a high risk of the icing phenomenon, so that the media discharge line 93 includes an auxiliary heater (not shown) and heats the heat transfer media, and then supplies the heated heat transfer media to the media tank 61 or the media pump 62, thereby smoothly using the heat transfer media.

The media discharge line 93 may further include a temporary media storing tank 95. The temporary media storing tank 95 may temporarily store the low-temperature heat transfer media discharged from the heat exchanger 50, heat the temporarily stored heat transfer media through external heat sources (air and the like), and then supply the heated heat transfer media to the media tank 61 or the media pump 62.

The media discharge line 93 may cause the heat transfer media to be discharged from the heat exchanger 50 be supplied to the media tank 61 or the media pump 62 by passing through the temporary media storing tank 95, or cause the heat transfer media to be discharged from the heat exchanger 50 be supplied to the media tank 61 or the media pump 62 by bypassing the temporary media storing tank 95.

To this end, the media discharge line 93 is divided from an upstream of the temporary media storing tank 95 to be connected to the temporary media storing tank 95, or the media tank 61 or the media pump 62, and the passing or the bypassing of the temporary media storing tank 95 may be controlled by a temporary storage valve (not shown) provided in the media discharge line 93. In this case, the temporary storage valve may be provided at a branch point of the media discharge line 93 at the upstream of the temporary media storing tank 95.

When the heat transfer media are discharged along the media discharge line 93, a water level of the media tank 61 may be maintained in a reduced state. Accordingly, the heat transfer media stored in the temporary media storing tank 95 may be first supplied to the media pump 62.

Otherwise, the heat transfer media stored in the media tank 61 and the temporary media storing tank 95 may simultaneously flow into the media pump 62, or separately flow into the media pump 62.

As described above, in the present embodiment, it is possible to prevent the problems of damage to the heat exchanger 50, stoppage of the system due to the icing phenomenon and the like by changing the flow rate of the heat transfer media flowing into the media heater 63 or the calories supplied to the heat transfer media by the media heater so as to prevent the generation of the icing phenomenon in the heat transfer media cooled in the heat exchanger 50, and discharging the heat transfer media remaining inside the heat exchanger 50 to the media discharge line 93 when abnormality is generated in the media circulation.

In a third embodiment of the present invention, the controller 90 sets a gasification prevention reference value for preventing the heat transfer media from being gasified (the material included in the heat transfer media may be gasified), and changes the flow rate of the heat transfer media flowing into the media heater 63 or the calories supplied to the heat transfer media by the media heater 63 based on the state value of the heat transfer media by the media state detecting sensor 80 and the gasification prevention reference value.

The heat transfer media may be glycol water as described in the second embodiment and include water. Therefore, when the heat transfer media are heated by the media heater 63, water included in the heat transfer media is evaporated and leaks. As a result, it is impossible to use the heat transfer media.

Accordingly, the controller 90 may cause a temperature, which is a state value of the heat transfer media, to be equal to or lower than a temperature set as the gasification prevention reference value. In this case, the gasification prevention reference value, which is a temperature for preventing water included in the heat transfer media from being gasified, may be 95° C., which is changeable.

In this case, the media state detecting sensor 80 means the first media state detecting sensor 81, and the state value of the heat transfer media means the temperature of the heat transfer media heated by the media heater 63. The temperature of the heat transfer media may be changed according to a heat source supplied to the heat transfer media by the media heater 63, and when the heat transfer media receive the relatively large amount of calories for each unit flow rate by the heat source supplied to the media heater 63 according to the decrease in the flow rate of the heat transfer media, a cracking phenomenon, in which the temperature of the heat transfer media is increased so that water is separated, may be generated.

In order to prevent the generation of the cracking phenomenon, the controller 90 may control the bypass adjusting valve 651, control the driving of the media pump 62, or control the degree of opening of the heat source supply valve 661 so that the temperature of the heat transfer media discharged from the media heater 63 is lower than the temperature set as the gasification prevention reference value.

Specifically, when the temperature of the heat transfer media is equal to or higher than the gasification prevention reference value, the controller 90 may prevent the generation of the cracking phenomenon by increasing a degree of opening of the bypass adjusting valve 651 (the cracking phenomenon is prevented at a joint flow of the heat transfer media bypassing the media heater 63 and the heat transfer media passing through the media heater 63), increasing RPM of the media pump 62 (when the calories supplied to the media heater 63 are uniform, the heat transfer media receive relatively smaller calories for each unit flow rate by the supplied calories of the media heater 63, thereby preventing the cracking phenomenon), and decreasing the temperature of the heat transfer media discharged from the media heater 63 and moving to the heat exchanger 50 by decreasing the degree of opening of the heat source supply valve 661.

Further, in the present embodiment, the present invention may further include a phase separator 92. The phase separator 92 is provided at the downstream of the media heater 63 of the media circulation line 64, and detects the gasification of the heat transfer media (or the gasification of the material included in the heat transfer media), discharges the gasified heat transfer media (or the material included in the heat transfer media) to the outside, and causes the remaining heat transfer media to flow into the heat exchanger 50 through the media circulation line 64.

The phase separator 92 may be a gas-liquid separator, and may separate evaporated gas and supply the liquid-state heat transfer media to the heat exchanger 50 for the heat transfer media in which the cracking phenomenon is generated. The phase separator 92 may be provided at a downstream of a point, at which the branch line 65 is connected to the media circulation line 64, at the downstream of the media heater 63.

In other words, the aforementioned control of the controller 90 is provided for the purpose of preventing the cracking, and the phase separator 92 is provided for the purpose of preparing a case where the cracking is generated. In this case, since the material, discharged from the phase separator 92, may be steam, the material may be discharged to the air without separate purification.

As described above, the controller 90 may maintain the temperature of the heat transfer media heated by the media heater 63 to be lower than the gasification prevention reference value, so that it is possible to prevent the cracking of the heat transfer media, and even though the cracking is generated, the controller 90 may remove a gaseous material through the phase separator 92 to implement smooth heating of the liquefied gas.

In a fourth embodiment of the present invention, the controller 90 causes the measured temperature of the liquefied gas to be equal to or greater than the demanded temperature of the source of demand 20, and decreases (minimizes) the flow rate of the heat transfer media flowing into the media heater 63. The measured temperature of the liquefied gas is a value measured by the liquefied gas temperature sensor 70 and means a temperature of the liquefied gas heated in the heat exchanger 50.

The controller 90 may improve efficiency of the media pump 62 by decreasing a circulation flow rate of the heat transfer media within a range in which the liquefied gas meets the demanded temperature of the source of demand 20.

As the flow rate of the heat transfer media circulating along the media circulation line 64 is large, efficiency of the media pump 62, and the like provided in the media circulation line 64 may be decreased. Accordingly, the controller 90 may decrease the flow rate of the heat transfer media flowing into the media heater 63 as compared to the earlier case, but in order to prevent the heating temperature of the liquefied gas from being decreased more than needed due to the decrease in the flow rate of the heat transfer media, the controller 90 may cause the measured temperature of the liquefied gas to meet the demanded temperature of the source of demand 20.

The controller 90 may control the flow rate of the heat transfer media supplied to the media heater 63 from the media pump 62 by controlling the driving of the media pump 62, and particularly, may adjust RPM of the media pump 62. Further, the controller 90 may control the flow rate of the heat transfer media by adjusting the degree of opening of the flow rate adjusting valve 67 provided at the downstream of the media pump 62 on the media circulation line 64.

The controller 90 may decrease the flow rate of the heat transfer media based on the measured temperature of the liquefied gas, or may decrease the flow rate of the heat transfer media while causing a difference between the temperatures of the heat transfer media at the front and rear ends of the heat exchanger 50, detected by the media state detecting sensor 80, to be equal to or greater than a predetermined value.

The difference between the temperatures of the heat transfer media at the front and rear ends of the heat exchanger 50 means a difference between a temperature measured by the first media state detecting sensor 81 and a temperature measured by the second media state detecting sensor 82, and may mean calories supplied to the liquefied gas. In other words, when the difference between the temperatures of the heat transfer media at the front and rear ends of the heat exchanger 50 is large, it means that the liquefied gas receives the large amount of heat. Accordingly, the controller 90 may cause the difference between the temperatures of the heat transfer media to be equal to or greater than the predetermined value so that the liquefied gas may be sufficiently heated to the demanded temperature of the liquefied gas of the source of demand 20, and the controller 90 may decrease the flow rate of the heat transfer media.

In this case, the predetermined value for the comparison with the difference between the temperatures of the heat transfer media at the front and rear ends of the heat exchanger 50 may be changed according to the flow rate of the liquefied gas, so that the controller 90 may consider the flow rate of the heat transfer media together with the difference in the temperatures of the heat transfer media. The flow rate of the heat transfer media may be detected by the aforementioned media flow rate sensor 671.

As described above, in the present embodiment, the liquefied gas is heated to the demanded temperature of the liquefied gas of the source of demand 20 considering the flow rate of the heat transfer media and the difference in the temperatures at the front and rear ends of the heat exchanger 50, and the flow rate of the heat transfer media flowing into the media heater 63 is decreased, thereby improving efficiency of the media pump 62.

Hereinafter, a liquefied gas treatment method according to first to fourth embodiments of the present invention will be described in detail with reference to FIGS. 3 to 10. The liquefied gas treatment method according to the first to fourth embodiments of the present invention may be implemented by the liquefied gas treatment system 2 according to the first to fourth embodiments of the present invention.

FIG. 3 is a flowchart of a liquefied gas treatment method according to a first embodiment of the present invention.

As illustrated in FIG. 3, the liquefied gas treatment method according to the first embodiment of the present invention includes measuring a temperature of liquefied gas supplied to the source of demand 20 (S110), calculating a target temperature of the heat transfer media based on the measured temperature of the liquefied gas (S120), and changing a flow rate of the heat transfer media flowing into the media heater 63 or calories applied to the heat transfer media by the media heater 63 according to the target temperature of the heat transfer media (S130).

In step S110, the temperature of the liquefied gas supplied to the source of demand 20 is measured. The temperature of the liquefied gas may be measured by the liquefied gas temperature sensor 70, and in this case, the measured temperature of the liquefied gas, which is the temperature of the liquefied gas between the heat exchanger 50 and the source of demand 20, may be the temperature of the liquefied gas heated by the heat exchanger 50.

When the temperature of the liquefied gas measured in step 110 is not appropriate for a demanded temperature of the liquefied gas of the source of demand 20, the controller 90 may control the flow rate of the heat transfer media to be supplied to the media heater 63 or the flow rate supplied to the heat transfer media by the media heater 63.

In step S120, the target temperature of the heat transfer media is calculated based on the measured temperature of the liquefied gas. The target temperature of the heat transfer media may be calculated by PID control through a deviation between the measured temperature of the liquefied gas and the demanded temperature of the liquefied gas of the source of demand 20. Otherwise, the target temperature of the heat transfer media may be calculated through a proportional conversion using a temperature range of the demanded temperature of the liquefied gas of the source of demand 20 and a temperature range of the heat transfer media. The calculation of the target temperature has been described in the description of the target temperature calculator 91, so that a detailed description thereof will be omitted.

As described above, in the present embodiment, it is possible to implement cascade control of calculating the target temperature of the heat transfer media based on the measured temperature of the liquefied gas and then controlling a flow of the heat transfer media based on the target temperature. In the present embodiment, step S120 may be omitted, and the flow rate of the heat transfer media and the like may be directly controlled based on the measured temperature of the liquefied gas as a matter of course.

In step S130, the flow rate of the heat transfer media flowing into the media heater 63 or the calories supplied to the heat transfer media by the media heater 63 are changed according to the target temperature of the heat transfer media. In the present embodiment, in step S130, it is possible to implement the cascade control of inducing the target temperature of the heat transfer media based on the measured temperature of the liquefied gas, and controlling a flow of the heat transfer media based on the target temperature of the heat transfer media, or it is possible to implement direct control of changing a flow of the heat transfer media according to the measured temperature of the liquefied gas, instead of using the target temperature of the heat transfer media. Detailed contents of the control of the flow of the heat transfer media in step S130 will be described in detail with reference to FIG. 4.

FIG. 4 is a detailed flowchart of step S130 of the liquefied gas treatment method according to the first embodiment of the present invention.

As illustrated in FIG. 4, step S130 of the liquefied gas treatment method according to the first embodiment of the present invention includes causing at least some of the heat transfer media to bypass the media heater 63, in such a manner that the flow rate of the heat transfer media bypassing the media heater 63 is controlled (S131), controlling driving of the media pump 62 supplying the heat transfer media to the media heater 63 (S132), and controlling the amount of heat sources supplied to the heat transfer media flowing into the media heater 63 (S133).

In step S131, at least some of the heat transfer media bypasses the media heater 63, in such a manner that the flow rate of the heat transfer media bypassing the media heater 63 is controlled. To this end, in the present embodiment, the aforementioned branch line 65 may be used.

The heat transfer media flow into the media heater 63 through the media pump 62, and some of the heat transfer media flows to the downstream of the media heater 63 via the branch line 65 by the bypass adjusting valve 651 provided on the branch line 65, and the remaining heat transfer media flow into the media heater 63 to be heated by steam and the like in the media heater 63.

In this case, as the flow rate of the heat transfer media bypassing the media heater 63 is large, the temperature of the heat transfer media at the downstream of the media heater 63, that is, the upstream of the heat exchanger 50, may be decreased, and to the contrary, as the flow rate of the heat transfer media bypassing the media heater 63 is small, the temperature of the heat transfer media flowing into the heat exchanger 50 may be increased.

In other words, in step S131, when the measured temperature of the liquefied gas is lower than the demanded temperature of the liquefied gas of the source of demand 20, the controller 90 may decrease the flow rate of the heat transfer media bypassing the media heater 63 according to the calculated target temperature of the heat transfer media so as to meet the demanded temperature of the liquefied gas of the source of demand 20, but on the contrary, when the measured temperature of the liquefied gas is higher than the demanded temperature of the liquefied gas of the source of demand 20, the controller 90 may decrease the temperature of the heat transfer media flowing into the heat exchanger 50 by increasing the flow rate bypassing the media heater 63 based on the target temperature of the heat transfer media calculated by the target temperature calculator 91.

In step S132, the driving of the media pump 62 supplying the heat transfer media to the media heater 63 is controlled. In step S131, some of the heat transfer media bypasses the media heater 63, but in step S132, a flow of the heat transfer media flowing into the media heater 63 may be changed.

In other words, in the present embodiment, it is possible to change the flow rate supplied to the media heater 63 from the media pump 62 by controlling a speed or a pressure of the media pump 62, and thus similar to step S131, the heat transfer media may be heated to the target temperature by the media heater 63 to flow into the heat exchanger 50.

In step S133, the amount of heat sources supplied to the heat transfer media flowing into the media heater 63 is controlled. In steps S131 and S132, the flow rate of the heat transfer media flowing into the media heater 63 may be controlled, but in step S133, the amount of heat sources supplied by the media heater 63 may be controlled. In this case, the heat source may be steam, and the amount of heat sources may be adjusted by adjusting a degree of opening of the heat source supply line 66 connected to the media heater 63. The degree of opening of the heat source supply line 66 may be implemented by the heat source supply valve 661 provided on the heat source supply line 66.

When the amount of heat sources is changed, the calories of the heat transfer media heated by and discharged from the media heater 63 may be changed, and thus, the heat transfer media are heated to the target temperature, so that the heat transfer media may sufficiently heat the liquefied gas to the demanded temperature of the source of demand 20 in the heat exchanger 50.

As described above, in the present embodiment, it is possible to easily control the temperature of the liquefied gas to be appropriate to the demanded temperature of the liquefied gas of the source of demand 20 by implementing the cascade control of calculating the target temperature of the heat transfer media based on the measured temperature of the liquefied gas, and adjusting the flow rate of the heat transfer media supplied to the media heater 63 through the target temperature of the heat transfer media or the amount of calories supplied to the heat transfer media by the media heater 63.

FIG. 5 is a flowchart of a liquefied gas treatment method according to a second embodiment of the present invention.

As illustrated in FIG. 5, the liquefied gas treatment method according to the second embodiment of the present invention includes setting a coagulation prevention reference value for preventing heat transfer media from being coagulated (S210), detecting a state of the heat transfer media circulating through the media heater 63 and the heat exchanger 50 (S220), and changing a flow rate of the heat transfer media flowing into the media heater 63 or calories supplied to the heat transfer media by the media heater 63 based on a state value of the heat transfer media and the coagulation prevention reference value (S230).

In step S210, the coagulation prevention reference value for preventing the heat transfer media from being coagulated (a material included in the heat transfer media may be coagulated) is set. The heat transfer media may be glycol water and consist of water and ethylene glycol. In this case, when the heat transfer media are cooled to be in an extremely low temperature state, water is frozen to disturb use of the heat transfer media. Accordingly, in step S210, a temperature for preventing water included in the heat transfer media from being frozen, that is, the coagulation prevention reference value, may be set, and the coagulation prevention reference value may be, for example, 30° C., but is not limited thereto.

In step S220, the state of the heat transfer media circulating through the media heater 63 and the heat exchanger 50 is detected. The state of the heat transfer media may be the temperature of the heat transfer media, and the temperature of the heat transfer media may be detected downstream of or in the heat exchanger 50.

In other words, the state of the heat transfer media means the temperature of the heat transfer media cooled by the liquefied gas in the heat exchanger 50, and when it is determined that the heat transfer media are supercooled, the temperature of the heat transfer media may be increased in step S230.

In step S230, the flow rate of the heat transfer media flowing into the media heater 63 or the calories supplied to the heat transfer media by the media heater 63 are changed based on the state value of the heat transfer media and the coagulation prevention reference value. In step S230, the state value of the heat transfer media may be equal to or greater than the coagulation prevention reference value, and step S230 will be described in detail with reference to FIG. 6 below.

FIG. 6 is a detailed flowchart of step S230 of the liquefied gas treatment method according to the second embodiment of the present invention.

As illustrated in FIG. 6, step S230 of the liquefied gas treatment method according to the second embodiment of the present invention includes causing at least some of the heat transfer media bypass the media heater 63, in such a manner that the flow rate of the heat transfer media bypassing the media heater 63 is controlled (S231), controlling driving of the media pump 62 supplying the heat transfer media to the media heater 63 (S232), and controlling the amount of heat sources supplied to the heat transfer media flowing into the media heater 63 (S233).

In step S231, at least some of the heat transfer media bypasses the media heater 63, in such a manner that the flow rate of the heat transfer media bypassing the media heater 63 is controlled. The controlling of the flow rate of the heat transfer media bypassing the media heater 63 is the same as that described in step S131. However, in the present embodiment, step S231 is different from step 131 in that when the heat transfer media are cooled in the heat exchanger 50, the temperature of the cooled heat transfer media is compared with the coagulation prevention reference value to change a degree of opening of the bypass adjusting valve 651.

In other words, when the temperature of the heat transfer media discharged from the heat exchanger 50 is lower than the coagulation prevention reference value, the controller 90 decreases the degree of opening of the bypass adjusting valve 651 and thus causes most of the heat transfer media to flow into the media heater 63, so that the icing phenomenon is prevented from being generated even though the heat transfer media are cooled in the heat exchanger 50.

In step S232, the driving of the media pump 62 supplying the heat transfer media to the media heater 63 is controlled. The control of the driving of the media pump 62 is the same as that described in step S132, so that in the present embodiment, the RPM of the media pump 62 and the like may be adjusted in order to prevent the icing of the heat transfer media. In other words, when the temperature of the heat transfer media at the downstream of the heat exchanger 50 is detected to be equal to or lower than the coagulation prevention reference value, it is possible to increase total calories of the heat transfer media supplied to the heat exchanger 50 by increasing the RPM of the media pump 62. Accordingly, even though the heat transfer media lose heat to the liquefied gas, the icing phenomenon is prevented from being generated.

In step S233, the amount of heat sources supplied to the heat transfer media flowing into the media heater 63 is controlled. The amount of heat sources supplied to the heat transfer media flowing into the media heater 63 may be controlled by the adjustment of the degree of opening of the heat resource supply valve 661 as described in step S133.

When it is detected that the temperature of the heat transfer media is equal to or lower than the coagulation prevention reference value, the degree of opening of the hear resource supply valve 661 is increased, and thus the heat transfer media receive the relatively large amount of heat resources (steam and the like) from the media heater 63 to flow into the heat exchanger 50, so that even though the heat transfer media are cooled during the heat exchange with the liquefied gas, water included in the heat transfer media is not frozen.

Further, in the present embodiment, the method may further include discharging the heat transfer media flowing into the heat exchanger 50 to the outside based on the state value of the heat transfer media and the coagulation prevention reference value (S240).

Step S240 is performed for the purpose of preparing the case in which the heat transfer media are iced in the heat exchanger 50. For example, when a problem is generated in the media circulation, even though the heat transfer media flow into the heat exchanger 50 while having sufficient calories, the heat transfer media may be supercooled according to the continuous cooling by the liquefied gas, and performance of the heat exchanger 50 may be degraded, or even worse, the system may be stopped.

Accordingly, in step S240, when the temperature in or downstream of the heat exchanger 50, which is the state value of the heat transfer media, is lower than the coagulation prevention reference value, it is estimated that the risk of the icing phenomenon is increased, and the heat transfer media remaining in the heat exchanger 50 may be discharged to the outside.

In this case, the discharged heat transfer media may return to the media tank 61 or the media pump 62 along the media discharge line 93, and may be stored in the temporary media storing tank 95 and then processed.

As described above, in the present embodiment, it is possible to prevent water included in the heat transfer media from being frozen due to the supercooling of the heat transfer media, which are heated by the media heater 63 to flow into the heat exchanger 50, by the liquefied gas, and when a problem is generated in the media circulation so that the risk of the icing phenomenon in the heat transfer media remaining in the heat exchanger 50 is increased, the heat transfer media are discharged to the outside through the media discharge line 93, thereby preventing the icing phenomenon of the heat transfer media and preventing the heat exchanger 50 from being damaged.

Figure 7:
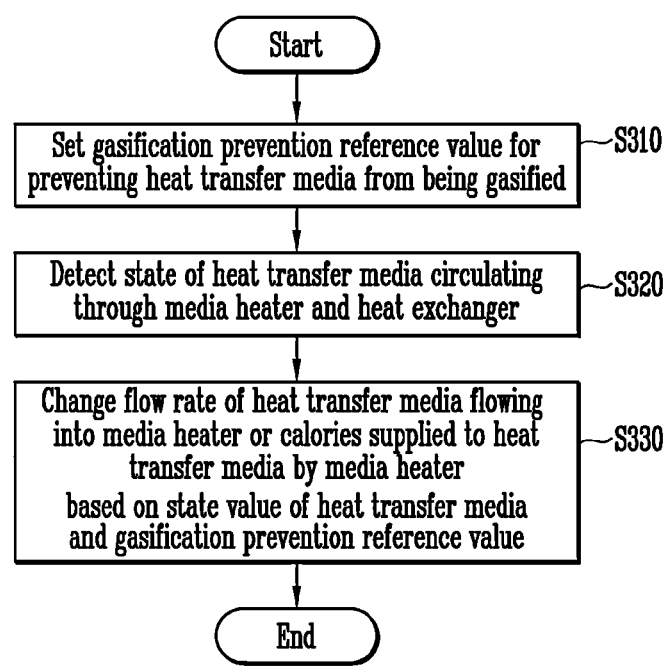
FIG. 7 is a flowchart of a liquefied gas treatment method according to a third embodiment of the present invention.

FIG. 7 is a flowchart of a liquefied gas treatment method according to a third embodiment of the present invention.

As illustrated in FIG. 7, the liquefied gas treatment method according to the third embodiment of the present invention includes setting a gasification prevention reference value for preventing heat transfer media from being gasified (S310), detecting a state of the heat transfer media circulating through the media heater 63 and the heat exchanger 50 (S320), and changing a flow rate of the heat transfer media flowing into the media heater 63 or calories supplied to the heat transfer media by the media heater 63 based on a state value of the heat transfer media and the gasification prevention reference value (S330).

In step S310, the gasification prevention reference value for preventing the heat transfer media from being gasified (a material included in the heat transfer media may be gasified) is set. The heat transfer media may be glycol water similar to the second embodiment, and when the heat transfer media are glycol water, water is included in the heat transfer media, so that when the heat transfer media are overheated, water may be evaporated.

Accordingly, in the present embodiment, in order to prevent the heat transfer media from being overheated in the media heater 63, the gasification prevention reference value may be set, and the gasification prevention reference value may be a temperature for preventing the water included in the heat transfer media from being gasified, and for example, 95° C., but the present invention is not limited thereto.

In step S320, the state of the heat transfer media circulating through the media heater 63 and the heat exchanger 50 is detected. The state of the heat transfer media may be the temperature of the heat transfer media flowing from the downstream of the media heater 63 to the heat exchanger 50, and in this case, the temperature of the heat transfer media may be a temperature before or after the heat transfer media bypassing the media heater 63 are joined.

In step S330, the flow rate of the heat transfer media flowing into the media heater 63 or the calories supplied to the heat transfer media by the media heater 63 are changed based on the state value of the heat transfer media and the gasification prevention reference value. In step S330, the state value of the heat transfer media may be lower than the gasification prevention reference value, and detailed contents thereof will be described below with reference to FIG. 8.

Figure 8:
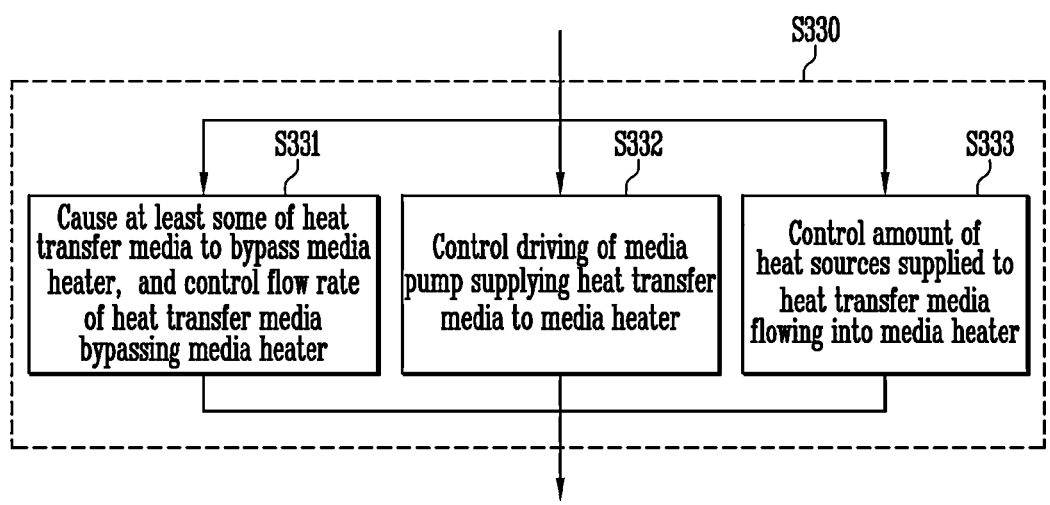
FIG. 8 is a detailed flowchart of step S330 of the liquefied gas treatment method according to the third embodiment of the present invention.

FIG. 8 is a detailed flowchart of step S330 of the liquefied gas treatment method according to the third embodiment of the present invention.

As illustrated in FIG. 8, step S330 of the liquefied gas treatment method according to the third embodiment of the present invention may include causing at least some of the heat transfer media bypass the media heater 63, in such a manner that the flow rate of the heat transfer media bypassing the media heater 63 is controlled (S331), controlling driving of the media pump 62 supplying the heat transfer media to the media heater 63 (S332), and controlling the amount of heat sources supplied to the heat transfer media flowing into the media heater 63 (S333).

In step S331, at least some of the heat transfer media bypasses the media heater 63, in such a manner that the flow rate of the heat transfer media bypassing the media heater 63 is controlled. The contents of the adjustment of the flow rate of the heat transfer media bypassing the media heater 63 in step S331 are similar to those of aforementioned steps S131 and S231, but the present embodiment is provided for the purpose of preventing the heat transfer media from being overheated at the downstream of the media heater 63, so that when the temperature of the heat transfer media is higher than the gasification prevention reference value, a degree of opening of the bypass adjusting valve 651 may be increased. When the degree of opening of the bypass adjusting valve 651 is increased, the cracking risk may be decreased when the heat transfer media passing through the media heater 63 and the heat transfer media bypassing the media heater 63 are joined.

In step S332, the driving of the media pump 62 supplying the heat transfer media to the media heater 63 is controlled. Step S332 is also similar to steps S132 and S232, and when the temperature of the heat transfer media is detected to be higher than the gasification prevention reference value, on an assumption that uniform hear sources (steam and the like) are supplied to the heat transfer media by the media heater 63, it is possible to prevent the heat transfer media from being overheated by steam by increasing RPM of the media pump 62 and thus increasing the flow rate of the heat transfer media supplied to the media heater 63.

In step S333, the amount of heat sources supplied to the heat transfer media flowing into the media heater 63 is controlled. Step S333 is also similar to steps S133 and S233, and the present embodiment is provided for the purpose of preventing the cracking phenomenon of the heat transfer media, so that it is possible to reduce the amount of heat sources supplied to the heat transfer media as necessary based on the temperature of the heat transfer media and the gasification prevention reference value.

Further, in the present embodiment, the method further includes discharging a material (which may be the heat transfer media or a material included in the heat transfer media) gasified from the heat transfer media discharged from the media heater 63 to the outside (not shown), and the remaining heat transfer media except for the gasified material flow into the heat exchanger 50, thereby smoothly heating the liquefied gas.

As described above, in the present embodiment, when the heat transfer media are heated by the media heater 63 to flow into the heat exchanger 50, the heat transfer media are prevented from being overheated by the media heater 63, thereby preventing the cracking phenomenon of the heat transfer media.

FIG. 9 is a flowchart of a liquefied gas treatment method according to a fourth embodiment of the present invention.

As illustrated in FIG. 9, the liquefied gas treatment method according to the fourth embodiment of the present invention includes measuring a temperature of liquefied gas supplied to the source of demand 20 (S410), detecting a state of heat transfer media circulating through the media heater 63 and the heat exchanger 50 (S420), and decreasing a flow rate of the heat transfer media flowing into the media heater 63 while the measured temperature of the liquefied gas becomes equal to or greater than a demanded temperature of the source of demand 20 (S430).

In step S410, the temperature of the liquefied gas supplied to the source of demand 20 is measured. The temperature of the liquefied gas is measured by the liquefied gas temperature sensor 70, and when the liquefied gas temperature sensor 70 is provided between the heat exchanger 50 and the source of demand 20, the measured temperature of the liquefied gas may be a temperature after being heated by the heat transfer media in the heat exchanger 50.

In step S420, the state of the heat transfer media circulating through the media heater 63 and the heat exchanger 50 is detected. In step S420, a difference between temperatures of the heat transfer media at the front and rear ends of the heat exchanger 50 may be detected. The difference between the temperatures means a difference between the temperatures detected by the first media state detecting sensor 81 and the second media state detecting sensor 82, respectively, and the first media state detecting sensor 81 is provided at the upstream of the heat exchanger 50, and the second media state detecting sensor 82 is provided at the downstream of the heat exchanger 50 on the media circulation line 64, so that the difference between the temperatures may be a value obtained by subtracting the temperature of the second media state detecting sensor 82 from the temperature of the first media state detecting sensor 81.

The difference between the temperatures of the heat transfer media may mean the calories supplied to the liquefied gas by the heat exchanger 50. In this case, in order to accurately measure the calories, in step S420, the flow rate of the heat transfer media may be considered together, and the flow rate of the heat transfer media may be measured by the media flow rate sensor 671.

When the difference between the temperatures of the heat transfer media and the flow rate of the heat transfer media are obtained, the calories supplied to the liquefied gas by the heat exchanger 50 may be calculated. Accordingly, in the present embodiment, it may be understood that the difference between the temperatures of the heat transfer media needs to be equal to or greater than a predetermined value through a comparison between the temperature of the liquefied gas measured in step S410 and the demanded temperature of the liquefied gas of the source of demand 20.

In step S430, the measured temperature of the liquefied gas may be equal to or greater than the demanded temperature of the source of demand 20, and the flow rate of the heat transfer media flowing into the media heater 63 is decreased (minimized). In order to cause the measured temperature of the liquefied gas to be equal to or greater than the demanded temperature of the source of demand 20, the calories of the heat transfer media need to be sufficiently obtained. Accordingly, in step S430, the difference between the temperatures of the heat transfer media at the front and rear ends of the heat exchanger 50 may be equal to or greater than a predetermined value while decreasing the flow rate of the heat transfer media flowing into the media heater 63.

In this case, the predetermined value may be calculated based on the measured temperature of the liquefied gas, the demanded temperature of the source of demand 20, the flow rate of the heat transfer media, and the like, and a calculation process may be performed based on a general calorie calculation.

Hereinafter, contents of the decrease in the flow rate of the heat transfer media flowing into the media heater 63 in step S430 will be described in detail with reference to FIG. 10.

FIG. 10 is a detailed flowchart of step S430 of the liquefied gas treatment method according to the fourth embodiment of the present invention.

As illustrated in FIG. 10, step S430 of the liquefied gas treatment method according to the fourth embodiment of the present invention may include controlling driving of the media pump 62 supplying the heat transfer media to the media heater 63 (S431), and controlling a degree of opening of the flow rate adjusting valve 67 provided at the upstream of the media heater 63 (S432).

In step S431, the driving of the media pump 62 supplying the heat transfer media to the media heater 63 is controlled. Step S431 is similar to steps S132, S232, and S332. According to the present embodiment, it is possible to improve efficiency of media pump 62 and decrease energy consumption by minimizing the driving of the media pump 62. In other words, in the present embodiment, the difference between the temperatures of the heat transfer media at the front and rear ends of the heat exchanger 50 is sufficiently ensured, and the flow rate of the heat transfer media may be decreased by reducing the driving of the media pump 62. In this case, whether the difference between the temperatures of the heat transfer media is sufficiently ensured may be identified by each media state detecting sensor 80.

In step S432, the degree of opening of the flow rate adjusting valve 67 provided at the upstream of the media heater 63 is controlled. The flow rate adjusting valve 67 may be provided at the upstream of the media heater 63 as aforementioned in the liquefied gas treatment system 2. The flow rate adjusting valve 67 may change the flow rate of the heat transfer media flowing into the media heater 63 by the adjustment of the degree of opening, and may be provided at the downstream of the media pump 62.

The degree of opening of the flow rate adjusting valve 67 may be decreased (minimized) within a range in which the liquefied gas is sufficiently heated to the demanded temperature of the liquefied gas of the source of demand 20. Even though the degree of opening of the flow rate adjusting valve 67 is decreased, the difference between the temperatures of the heat transfer media at the front and rear ends of the heat exchanger 50 is maintained to be equal to or greater than a predetermined value, so that the liquefied gas may sufficiently receive calories.

In the present embodiment, step S431 and step S432 are separately performed. However, step S431 and step S432 may be simultaneously driven, so that RPM of the media pump 62 may be adjusted and the degree of opening of the flow rate adjusting valve 67 may be adjusted.

As described above, according to the present embodiment, the liquefied gas is heated so as to meet the demanded temperature of the liquefied gas of the source of demand 20 in the heat exchanger 50, and the flow rate of the heat transfer media passing through the heat exchanger 50, the media pump 62, and the like along the media circulation line 64 is decreased, thereby improving efficiency of the media pump 62.

[Description of Main Reference Numerals of Drawings]

| | |
|---|---|
| 1: Liquefied gas processign system in the related art | |
| 2: Liquefied gas processign system of the presnet invention | |
| 10: Liquefied gas storing tank | 20: Source of demand |
| 21: Liquefied gas supply line | 30: Pump |
| 31: Boosting pump | 32: High-pressure pump |
| 40: Electric heater | 50: Heat exchanger |
| 60: Media supply device | 61: Media tank |
| 62: Media pump | 63: Media heater |
| 64: Media circulation line | 65: Branch line |
| 651: Bypass adjusting valve | 66: Heat resource supply line |
| 67: Flow rate adjusting valve | 671: Media flow rate sensor |
| 661: Heat source supply valve | 70: Liquefied gas temperature sensor |
| 80: Media state detecting sensor | 81: First media state detecting sensor |
| 82: Second media state detecting sensor | 90: Controller |
| 91: Target temperature calculator | 92: Phase separator |
| 93: Media discharge line | 94: Media discharge valve |
| 95: Temporary media storing tank | |

The invention claimed is:

1. A liquefied gas treatment system, comprising:
a liquefied gas supply line connected from a liquefied gas storing tank to a source of demand;
a heat exchanger provided on the liquefied gas supply line between the source of demand and the liquefied gas storing tank and configured to exchange heat between the liquefied gas, supplied from the liquefied gas storing tank, and heat transfer media including water;
a media heater configured to heat the heat transfer media;
a media circulation line connected from the media heater to the heat exchanger;
a media state detecting sensor provided on the media circulation line and configured to measure a state value of the heat transfer media;
a controller setting a gasification prevention reference value, which is a temperature value for preventing water included in the heat transfer media from being gasified, and changing a flow rate of the heat transfer media flowing into the media heater or changing calories supplied to the heat transfer media by the media heater, on the basis of the state value of the heat transfer media by the media state detecting sensor and the gasification prevention reference value; and
a phase separator provided at a downstream of the media heater on the media circulation line and separating the heat transfer media in which a cracking phenomenon is generated into gas and liquid-state heat transfer media, wherein the phase separator discharges a gaseous material to an outside and supplies the liquid-state heat transfer media to the heat exchanger provided on the liquefied gas supply line between the liquefied gas storing tank and the source of demand through the media circulation line, the controller prevents a cracking of the heat transfer media, and the phase separator prepares a case where the cracking of the heat transfer media is generated.

2. The liquefied gas treatment system of claim 1, wherein the media state detecting sensor is provided at a downstream of the media heater on the media circulation line to detect a temperature of the heat transfer media.

3. The liquefied gas treatment system of claim 1, wherein the controller changes the flow rate of the heat transfer media or the calories supplied to the heat transfer media so that the state value of the heat transfer media is equal to or lower than the gasification prevention reference value.

4. The liquefied gas treatment system of claim 1, further comprising:
a branch line configured to cause at least some of the heat transfer media to be branched from the media circulation line and bypass the media heater,
wherein the controller adjusts the flow rate of the heat transfer media flowing into the branch line through a bypass adjusting valve provided on the branch line.

5. The liquefied gas treatment system of claim 1, further comprising:
a media tank configured to store the heat transfer media; and
a media pump configured to supply the heat transfer media stored in the media tank to the media heater,
wherein the controller controls the flow rate of the heat transfer media supplied to the media heater from the media pump by controlling driving of the media pump.

6. The liquefied gas treatment system of claim 1, further comprising:
a heat source supply line configured to supply heat sources to the media heater; and a heat source supply valve provided on the heat source supply line and configured to adjust a degree of opening of the heat source supply line, wherein the controller controls the amount of heat sources supplied to the heat transfer media by the media heater by controlling the degree of opening of the heat source supply valve.

7. The liquefied gas treatment system of claim 1, further comprising:

a pump provided on the liquefied gas supply line and configured to pressurize the liquefied gas discharged from the liquefied gas storing tank, wherein the heat exchanger exchanges heat between the liquefied gas supplied from the pump and the heat transfer media.

8. The liquefied gas treatment system of claim 1, wherein the heat transfer media are glycol water.

9. A liquefied gas treatment method in associated with a method of driving a liquefied gas treatment system which heats liquefied gas with heat transfer media including water in a heat exchanger, in such a manner that a media heater heats and supplies the heat transfer media to the heat exchanger, the liquefied gas treatment method comprising:

setting a gasification prevention reference value, which is a temperature value for preventing water included in the heat transfer media from being gasified;

detecting a state value of the heat transfer media;

changing a flow rate of the heat transfer media flowing into the media heater or changing calories supplied to the heat transfer media by the media heater on the basis of the state value of the heat transfer media and the gasification prevention reference value;

separating the heat transfer media in which a cracking phenomenon is generated into gas and liquid-state heat transfer media using a phase separator provided at a downstream of the media heater; and discharging a gaseous material to an outside of the phase separator and supplying the liquid-state heat transfer media to the heat exchanger provided on a liquefied gas supply line between a liquefied gas storing tank and a source of demand, wherein the setting the gasification prevention reference value and the changing the flow rate of the heat transfer media or the changing calories supplied to the heat transfer media prevent a cracking of the heat transfer media, and wherein the separating the heat transfer media and the discharging the gaseous material prepare a case where the cracking of the heat transfer media is generated.

10. The method of claim 9, wherein the detecting of the state value of the heat transfer media includes detecting a temperature of the heat transfer media at the downstream of the media heater.

11. The method of claim 10, wherein the changing of the flow rate of the heat transfer media includes changing the flow rate of the heat transfer media or the calories supplied to the heat transfer media so that the state value of the heat transfer media is equal to or lower than the gasification prevention reference value.

12. The method of claim 9, wherein the changing of the flow rate of the heat transfer media includes causing at least some of the heat transfer media to bypass the media heater, in such a manner that the flow rate of the heat transfer media bypassing the media heater is controlled.

13. The method of claim 9, wherein the changing of the flow rate of the heat transfer media includes controlling driving of a media pump supplying the heat transfer media to the media heater.

14. The method of claim 9, wherein the changing of the calories supplied to the heat transfer media includes controlling an amount of heat sources supplied to the heat transfer media flowing into the media heater.

* * * * *